United States Patent
Liu et al.

(10) Patent No.: US 10,910,976 B2
(45) Date of Patent: Feb. 2, 2021

(54) METHOD AND DEVICE FOR DRIVING MOTORS

(71) Applicant: Midea Group Co., Ltd., Foshan (CN)

(72) Inventors: Yi Liu, Foshan (CN); Jie Sun, Foshan (CN)

(73) Assignee: MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 15/930,375

(22) Filed: May 12, 2020

(65) Prior Publication Data

US 2020/0274471 A1    Aug. 27, 2020

Related U.S. Application Data

(63) Continuation of application No. PCT/CN2018/108563, filed on Sep. 29, 2018.

(30) Foreign Application Priority Data

Nov. 17, 2017   (CN) .......................... 2017 1 1146572

(51) Int. Cl.
*H02P 21/00* (2016.01)
*H02P 21/13* (2006.01)
*H02P 21/22* (2016.01)
*H02P 27/12* (2006.01)

(52) U.S. Cl.
CPC .............. *H02P 21/13* (2013.01); *H02P 21/22* (2016.02); *H02P 27/12* (2013.01)

(58) Field of Classification Search
CPC .......... H02P 21/18; H02P 27/08; H02P 21/14; H02P 21/22
See application file for complete search history.

(56) References Cited

U.S. PATENT DOCUMENTS 9,325,263 B1 *   4/2016   Costanzo ................ H02P 6/183

OTHER PUBLICATIONS

Midea Group Co. Ltd., Notice of First Review Opinion, CN201711146572.0, dated Apr. 15, 2019, 14 pgs.
Midea Group Co. Ltd., Notice of Second Review Opinion, CN201711146572.0, dated Sep. 25, 2019, 7 pgs.

* cited by examiner

*Primary Examiner* — Karen Masih
(74) *Attorney, Agent, or Firm* — Morgan, Lewis & Bockius LLP

(57) ABSTRACT

A method and device for diving a motor by synchronously calculating reconstructed phase current and phase voltage for a motor driver, including: sampling a direct current (DC) bus current and performing phase current reconstruction according to the DC bus current to acquire a three-phase current of a motor; during the phase current reconstruction, acquiring two sampled currents of each pulse width modulation (PWM) cycle as a two-phase current of the motor and acquiring a command voltage or a sampled voltage; and performing synchronous conversion on the two sampled currents and the command voltage or the sampled voltage to keep a current vector and a voltage vector synchronous, wherein the current vector and the voltage vector are input to a flux observer.

15 Claims, 3 Drawing Sheets sampling a DC bus current and performing phase current reconstruction according to the DC bus current to acquire a three-phase current of a motor — S1 during the phase current reconstruction, acquiring two sampled currents of each PWM cycle as a two-phase current of the motor and acquiring a command voltage or a sampled voltage — S2 performing synchronous conversion on the two sampled currents and the command voltage or the sampled voltage to allow a current vector and a voltage vector, that are input to a flux observer, to keep synchronous — S3

METHOD AND DEVICE FOR DRIVING MOTORS

CROSS-REFERENCE TO RELATED APPLICATION

This application is a continuation of PCT International Application No. PCT/CN2018/108563, filed Sep. 29, 2018, which claims priority to and benefits of Chinese Patent Application Serial No. 201711146572.0, filed Nov. 17, 2017, both of which are incorporated herein by reference in their entireties.

TECHNICAL FIELD

The present disclosure relates to a field of motor driving technologies, and more particularly to a method for synchronously calculating a reconstructed phase current and a phase voltage for a motor driver, a non-transitory computer-readable storage medium, a device for synchronously calculating a reconstructed phase current and a phase voltage for a motor driver, and a motor driving system.

BACKGROUND

For a high-performance AC motor driving system, a vector control technology, such as field-oriented control or direct torque control, is commonly used, on condition that accurate flux linkage position or speed information of the motor is acquired. In industrial, home appliance or automobile applications, in order to reduce hardware costs or ease mechanical installation restrictions, a flux observer can be used to replace position/speed sensors of the motor. In this way, the flux linkage position and speed information of the motor can be acquired by a software estimation method of the flux observer.

The flux observer needs to acquire current and voltage of the motor when estimating the flux linkage position and speed information of the motor. Specifically, the current of the motor may be acquired from hardware sampling, and the voltage of the motor may be a command voltage or acquired from the hardware sampling. Among several current sampling manners, a single measuring element is often used to sample the motor current due to fewer components and less cost.

However, when the single measuring element is used to sample currents of a motor, two sampled currents may be out of synchronization, or two sampled currents and a command voltage or a sampled voltage may be out of synchronization. When the motor is operated at a high frequency or a digital sampling frequency (i.e., a current loop control frequency, a pulse width modulation (PWM) switching frequency) is low, non-synchronization may cause a deviation in phase angle calculated by the flux observer and affect the control performance of the motor.

SUMMARY

The present disclosure seeks to solve at least one of the problems that exist in the related art to at least some extent. Accordingly, an object of the present disclosure is to provide a method for synchronously calculating a reconstructed phase current and a phase voltage for a motor driver, which may improve the accuracy of the angle output by the flux observer and allow the motor to run normally. Moreover, this calculation method has a small calculation amount and is easy to be realized.

A second object of the present disclosure is to provide a non-transitory computer-readable storage medium.

A third object of the present disclosure is to provide a device for synchronously calculating a reconstructed phase current and a phase voltage for a motor driver.

A fourth object of the present disclosure is to provide a motor driving system.

In order to achieve the above objects, in a first aspect, the present disclosure provides in embodiments a method for synchronously calculating a reconstructed phase current and a phase voltage for a motor driver, including: sampling a direct current (DC) bus current and performing phase current reconstruction according to the DC bus current to acquire a three-phase current of a motor; during the phase current reconstruction, acquiring two sampled currents of each PWM cycle as a two-phase current of the motor and acquiring a command voltage or a sampled voltage; performing synchronous conversion on the two sampled currents and the command voltage or the sampled voltage to allow a current vector and a voltage vector, that are input to a flux observer, to keep synchronous.

With such a method for synchronously calculating a reconstructed phase current and a phase voltage for a motor driver according to the embodiments of the present disclosure, the DC bus current is sampled and the phase current reconstruction is performed according to the DC bus current to acquire the three-phase current of the motor. During the phase current reconstruction, two sampled currents are acquired for each PWM cycle as the two-phase current of the motor and the command voltage or the sampled voltage is acquired. The synchronous conversion is performed on the two sampled currents and the command voltage or the sampled voltage to allow the current vector and the voltage vector, that are input to the flux observer, to keep synchronous. Therefore, the method may make the current vector and the voltage vector input to the flux observer at the same time, so as to improve the accuracy of the angle output by the flux observer and allow the motor to run normally. Moreover, this calculation method has a small calculation amount and is easy to be realized.

In addition, the method for synchronously calculating a reconstructed phase current and a phase voltage for a motor driver provided in the above embodiments may further include following additional technical features.

In an embodiment of the present disclosure, the synchronous conversion is performed on the two sampled currents and the command voltage or the sampled voltage in any one of the following manners of: (1) simultaneously converting the two sampled currents into two currents at a time corresponding to the command voltage or the sampled voltage; (2) simultaneously converting one of the two sampled currents and the command voltage or the sampled voltage into a current and a voltage at a time corresponding to the other one of the two sampled currents; (3) simultaneously converting the two sampled currents and the command voltage or the sampled voltage into two currents and a voltage at a random time in each PWM cycle.

In an embodiment of the present disclosure, the manner (1) is applied, if the two sampled currents correspond to a c-phase current and an a-phase current, the c-phase current and the a-phase current are synchronously converted according to the following formula:

$$\begin{bmatrix} i_\alpha \\ i_\beta \end{bmatrix} =$$

-continued $$\begin{bmatrix} i''_a \cdot \cos(\omega_e(t_{\Delta 1} + t_{\Delta 2})) + \dfrac{i'_c - i''_a \cos(\omega_e t_{\Delta 2} - 2\pi/3)}{\sin(\omega_e t_{\Delta 2} - 2\pi/3)} \cdot \sin(\omega_e(t_{\Delta 1} + t_{\Delta 2})) \\ \dfrac{i'_c - i''_a \cos(\omega_e t_{\Delta 2} - 2\pi/3)}{\sin(\omega_e t_{\Delta 2} - 2\pi/3)} \cdot \cos(\omega_e(t_{\Delta 1} + t_{\Delta 2})) - i''_a \cdot \sin(\omega_e(t_{\Delta 1} + t_{\Delta 2})) \end{bmatrix},$$

where $i_\alpha, i_\beta$ represent currents in a two-phase stationary coordinate system, respectively, $t_{\Delta 1}$ represents a time difference between the time corresponding to the command voltage or the sampled voltage and a time corresponding to the c-phase current, $t_{\Delta 2}$ represents a time difference between the time corresponding to the c-phase current and a time corresponding to the a-phase current, $\omega_e$ represents an electrical angular frequency, and $i''_a, i'_c$ represent the a-phase current and the c-phase current, respectively.

In an embodiment of the present disclosure, the manner (2) is applied, if the two sampled currents correspond to a c-phase current and an a-phase current, the command voltage or the sampled voltage, and the c-phase current and the a-phase current are synchronously converted according to the following formulas, respectively:

$$\begin{bmatrix} v''_\alpha \\ v''_\beta \end{bmatrix} = \begin{bmatrix} v_\alpha \cos(\omega_e(t_{\Delta 1} + t_{\Delta 2})) - v_\beta \sin(\omega_e(t_{\Delta 1} + t_{\Delta 2})) \\ v_\beta \cos(\omega_e(t_{\Delta 1} + t_{\Delta 2})) + v_\alpha \sin(\omega_e(t_{\Delta 1} + t_{\Delta 2})) \end{bmatrix},$$

$$\begin{bmatrix} i''_\alpha \\ i''_\beta \end{bmatrix} = \begin{bmatrix} i''_a \\ \dfrac{i''_c - i''_a \cos(\omega_e t_{\Delta 2} - 2\pi/3)}{\sin(\omega_e t_{\Delta 2} - 2\pi/3)} \end{bmatrix},$$

where $v_\alpha, v_\beta$ represent voltages in a two-phase stationary coordinate system, respectively, $v''_\alpha, v''_\beta$ represent voltages at a time corresponding to the a-phase current in the two-phase stationary coordinate system, respectively, $i''_\alpha, i''_\beta$ represent currents at the time corresponding to the a-phase current in the two-phase stationary coordinate system, respectively, $t_{\Delta 1}$ represents a time difference between the time corresponding to the command voltage or the sampled voltage and a time corresponding to the c-phase current, $t_{\Delta 2}$ represents a time difference between the time corresponding to the c-phase current and the time corresponding to the a-phase current, $\omega_e$ represents an electrical angular frequency, and $i''_a, i''_c$ represent the a-phase current and the c-phase current, respectively.

In an embodiment of the present disclosure, the manner (3) is applied, if the two sampled currents correspond to a c-phase current and an a-phase current, the command voltage or the sampled voltage, and the c-phase current and the a-phase current are synchronously converted according to the following formulas, respectively:

$$\begin{bmatrix} v'''_\alpha \\ v'''_\beta \end{bmatrix} = \begin{bmatrix} v_\alpha \cos(\omega_e(t_{\Delta 1} + t_{\Delta 2} + t_{\Delta 3})) - v_\beta \sin(\omega_e(t_{\Delta 1} + t_{\Delta 2} + t_{\Delta 3})) \\ v_\beta \cos(\omega_e(t_{\Delta 1} + t_{\Delta 2} + t_{\Delta 3})) + v_\alpha \sin(\omega_e(t_{\Delta 1} + t_{\Delta 2} + t_{\Delta 3})) \end{bmatrix},$$

$$\begin{bmatrix} i'''_\alpha \\ i'''_\beta \end{bmatrix} = \begin{bmatrix} i''_a \cos(\omega_e t_{\Delta 3}) - \dfrac{i'_c - i''_a \cos(\omega_e t_{\Delta 2} - 2\pi/3)}{\sin(\omega_e t_{\Delta 2} - 2\pi/3)} \cdot \sin(\omega_e t_{\Delta 3}) \\ \dfrac{i'_c - i''_a \cos(\omega_e t_{\Delta 2} - 2\pi/3)}{\sin(\omega_e t_{\Delta 2} - 2\pi/3)} \cdot \cos(\omega_e t_{\Delta 3}) + i''_a \sin(\omega_e t_{\Delta 3}) \end{bmatrix},$$

where $v_\alpha, v_\beta$ represent voltages in a two-phase stationary coordinate system, respectively, $v'''_\alpha, v'''_\beta$ represent voltages at a random time in the two-phase stationary coordinate system, respectively, $i'''_\alpha, i'''_\beta$ represent currents at the random time in the two-phase stationary coordinate system, respectively, $t_{\Delta 1}$ represents a time difference between the time corresponding to the command voltage or the sampled voltage and a time corresponding to the c-phase current, $t_{\Delta 2}$ represents a time difference between the time corresponding to the c-phase current and the time corresponding to the a-phase current, $t_{\Delta 3}$, represents a time difference between the time corresponding to the a-phase current and the random time, $\omega_e$ represents an electrical angular frequency, and $i''_a, i'_c$ represent the a-phase current and the c-phase current, respectively.

In order to achieve the above objects, in a second aspect, the present disclosure provides in embodiments a non-transitory computer-readable storage medium having stored therein computer programs that, when executed by a processor, cause the processor to perform a method for synchronously calculating a reconstructed phase current and a phase voltage for a motor driver provided in the embodiments of the first aspect of the present disclosure.

The non-transitory computer-readable storage medium according to the embodiments of the present disclosure may improve the accuracy of the angle output by the flux observer and allow the motor to run normally.

In order to achieve the above objects, in a third aspect, the present disclosure provides in embodiments a device for synchronously calculating a reconstructed phase current and a phase voltage for a motor driver, including: a current sampling module configured to sample a DC bus current; a current reconstructing module configured to perform phase current reconstruction according to the DC bus current to acquire a three-phase current of a motor; an acquiring module configured to acquire two sampled currents of each PWM cycle as a two-phase current of the motor and acquiring a command voltage or a sampled voltage during the phase current reconstruction; a synchronously calculating module configured to perform synchronous conversion on the two sampled currents and the command voltage or the sampled voltage to allow a current vector and a voltage vector, that are input to a flux observer, to keep synchronous.

With such a device for synchronously calculating a reconstructed phase current and a phase voltage for a motor driver according to the embodiments of the present disclosure, the current reconstructing module is configured to perform phase current reconstruction according to the DC bus current sampled by the current sampling module to acquire the three-phase current of the motor. The acquiring module is configured to acquire two sampled currents of each PWM cycle as the two-phase current of the motor and acquire the command voltage or the sampled voltage during the phase current reconstruction. The synchronously calculating module is configured to perform synchronous conversion on the two sampled currents and the command voltage or the sampled voltage to allow the current vector and the voltage vector, that are input to the flux observer, to keep synchronous. Therefore, the device may improve the accuracy of the angle output by the flux observer and allow the motor to run normally.

In addition, the device for synchronously calculating a reconstructed phase current and a phase voltage for a motor driver provided in the above embodiments may further include following additional technical features.

In an embodiment of the present disclosure, the synchronous calculating module is configured to perform the synchronous conversion on the two sampled currents and the command voltage or the sampled voltage in any one of the following manners of: (1) simultaneously converting the two sampled currents into two currents at a time corresponding to the command voltage or the sampled voltage; (2) simultaneously converting one of the two sampled currents and the command voltage or the sampled voltage into a current and a voltage at a time corresponding to the other one of the two sampled currents; (3) simultaneously converting the two sampled currents and the command voltage or the sampled voltage into two currents and a voltage at a random time in each PWM cycle.

In an embodiment of the present disclosure, the manner (1) is applied, if the two sampled currents correspond to a c-phase current and an a-phase current, the synchronously calculating module is configured to perform the synchronous conversion on the c-phase current and the a-phase current according to the following formula:

$$\begin{bmatrix} i_\alpha \\ i_\beta \end{bmatrix} = \begin{bmatrix} i_a'' \cdot \cos(\omega_e(t_{\Delta 1} + t_{\Delta 2})) + \frac{i_c' - i_a''\cos(\omega_e t_{\Delta 2} - 2\pi/3)}{\sin(\omega_e t_{\Delta 2} - 2\pi/3)} \cdot \\ \sin(\omega_e(t_{\Delta 1} + t_{\Delta 2})) \\ \frac{i_c' - i_a''\cos(\omega_e t_{\Delta 2} - 2\pi/3)}{\sin(\omega_e t_{\Delta 2} - 2\pi/3)} \cdot \cos(\omega_e(t_{\Delta 1} + t_{\Delta 2})) - \\ i_a'' \cdot \sin(\omega_e(t_{\Delta 1} + t_{\Delta 2})) \end{bmatrix},$$

where $i_\alpha$, $i_\beta$ represent currents in a two-phase stationary coordinate system, respectively, $t_{\Delta 1}$ represents a time difference between the time corresponding to the command voltage or the sampled voltage and a time corresponding to the c-phase current, $t_{\Delta 2}$ represents a time difference between the time corresponding to the c-phase current and a time corresponding to the a-phase current, $\omega_e$ represents an electrical angular frequency, and $i''_a, i_c$ represent the a-phase current and the c-phase current, respectively.

In an embodiment of the present disclosure, the manner (2) is applied, if the two sampled currents correspond to a c-phase current and an a-phase current, the synchronously calculating module is configured to perform the synchronous conversion on the command voltage or the sampled voltage, and the c-phase current and the a-phase current according to the following formulas, respectively:

$$\begin{bmatrix} v_\alpha'' \\ v_\beta'' \end{bmatrix} = \begin{bmatrix} v_\alpha\cos(\omega_e(t_{\Delta 1} + t_{\Delta 2})) - v_\beta\sin(\omega_e(t_{\Delta 1} + t_{\Delta 2})) \\ v_\beta\cos(\omega_e(t_{\Delta 1} + t_{\Delta 2})) + v_\alpha\sin(\omega_e(t_{\Delta 1} + t_{\Delta 2})) \end{bmatrix},$$

$$\begin{bmatrix} i_\alpha'' \\ i_\beta'' \end{bmatrix} = \begin{bmatrix} i_a'' \\ \frac{i_c' - i_a''\cos(\omega_e t_{\Delta 2} - 2\pi/3)}{\sin(\omega_e t_{\Delta 2} - 2\pi/3)} \end{bmatrix},$$

where $v_\alpha$, $v_\beta$ represent voltages in a two-phase stationary coordinate system, respectively, $v''_\alpha, v''_\beta$ represent voltages at a time corresponding to the a-phase current in the two-phase stationary coordinate system, respectively, $i'''_\alpha, i'''_\beta$ represent currents at the time corresponding to the a-phase current in the two-phase stationary coordinate system, respectively, $t_{\alpha 1}$ represents a time difference between the time corresponding to the command voltage or the sampled voltage and a time corresponding to the c-phase current, $t_{\Delta 2}$ represents a time difference between the time corresponding to the c-phase current and the time corresponding to the a-phase current, $\omega_e$ represents an electrical angular frequency, and $i''_a, i''_c$ represent the a-phase current and the c-phase current, respectively.

In an embodiment of the present disclosure, the manner (3) is applied, if the two sampled currents correspond to a c-phase current and an a-phase current, the synchronously calculating module is configured to perform the synchronous conversion on the command voltage or the sampled voltage, and the c-phase current and the a-phase current according to the following formulas, respectively:

$$\begin{bmatrix} v_\alpha'' \\ v_\beta'' \end{bmatrix} = \begin{bmatrix} v_\alpha\cos(\omega_e(t_{\Delta 1} + t_{\Delta 2} + t_{\Delta 3})) - v_\beta\sin(\omega_e(t_{\Delta 1} + t_{\Delta 2} + t_{\Delta 3})) \\ v_\beta\cos(\omega_e(t_{\Delta 1} + t_{\Delta 2} + t_{\Delta 3})) + v_\alpha\sin(\omega_e(t_{\Delta 1} + t_{\Delta 2} + t_{\Delta 3})) \end{bmatrix},$$

$$\begin{bmatrix} i_\alpha''' \\ i_\beta''' \end{bmatrix} = \begin{bmatrix} i_a''\cos(\omega_e t_{\Delta 3}) - \frac{i_c' - i_o''\cos(\omega_e t_{\Delta 2} - 2\pi/3)}{\sin(\omega_e t_{\Delta 2} - 2\pi/3)} \cdot \sin(\omega_e t_{\Delta 3}) \\ \frac{i_c' - i_a''\cos(\omega_e t_{\Delta 2} - 2\pi/3)}{\sin(\omega_e t_{\Delta 2} - 2\pi/3)} \cdot \cos(\omega_e t_{\Delta 3}) + i_a''\sin(\omega_e t_{\Delta 3}) \end{bmatrix},$$

where $v_\alpha, v_\beta$ represent voltages in a two-phase stationary coordinate system, respectively, $v_\alpha, v_\beta$ represent voltages at a random time in the two-phase stationary coordinate system, respectively, $i'''_\alpha, i'''_\beta$ represent currents at the random time in the two-phase stationary coordinate system, respectively, $t_{\Delta 1}$ represents a time difference between the time corresponding to the command voltage or the sampled voltage and a time corresponding to the c-phase current, $t_{\alpha 2}$ represents a time difference between the time corresponding to the c-phase current and the time corresponding to the a-phase current, $t_{\alpha 3}$ represents a time difference between the time corresponding to the a-phase current and the random time, $\omega_e$ represents an electrical angular frequency, and $i'''_a, i'_c$ represent the a-phase current and the c-phase current, respectively.

In order to achieve the above objects, in a fourth aspect, the present disclosure provides in embodiments a motor driving system, including a device for synchronously calculating a reconstructed phase current and a phase voltage for a motor driver provided in the embodiments of the third aspect of the present disclosure.

The motor driving system according to the embodiments of the present disclosure may improve the accuracy of the angle output by the flux observer and allow the motor to run normally.

DETAILED DESCRIPTION

Figure 1:
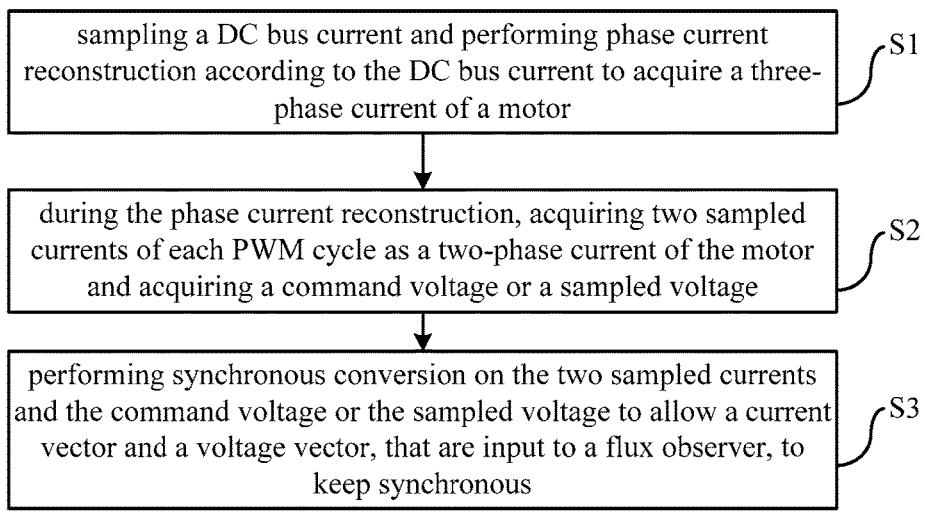
FIG. 1 is a flow chart of a method for synchronously calculating a reconstructed phase current and a phase voltage for a motor driver according to an embodiment of the present disclosure.

Embodiments of the present disclosure are described in detail below, examples of which are illustrated in the drawings. The same or similar elements are denoted by same reference numerals in different drawings unless indicated otherwise. The embodiments described herein with reference to drawings are explanatory, and used to generally understand the present disclosure. The embodiments shall not be construed to limit the present disclosure.

Method and device for synchronously calculating a reconstructed phase current and a phase voltage for a motor driver provided in the embodiments of the present disclosure are described below with reference to the drawings.

FIG. 1 is a flow chart of a method for synchronously calculating a reconstructed phase current and a phase voltage for a motor driver according to an embodiment of the present disclosure.

As shown in FIG. 1, the method for synchronously calculating a reconstructed phase current and a phase voltage for a motor driver according to the embodiments of the present disclosure may include the following steps.

In S1, a DC bus current is sampled and phase current reconstruction is performed according to the DC bus current to acquire a three-phase current of a motor.

Figure 2:
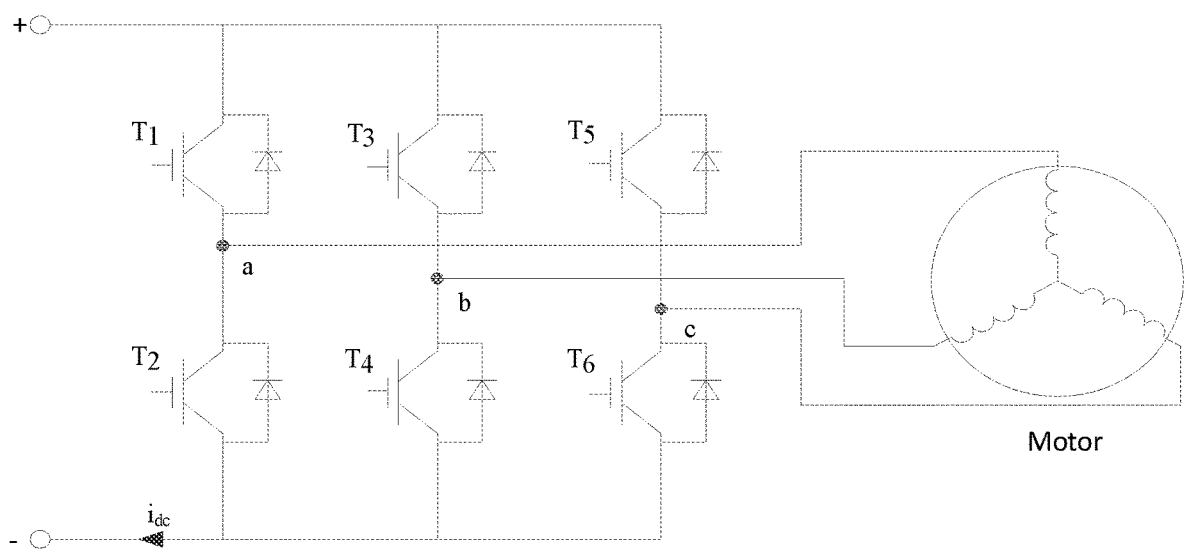
FIG. 2 is a schematic diagram of sampling a DC bus current with a single measuring element and acquiring a three-phase current of a motor according to an embodiment of the present disclosure.

FIG. 2 is a schematic diagram of sampling a DC bus current with a single measuring element and acquiring a three-phase current of a motor according to an embodiment of the present disclosure.

Figure 3:
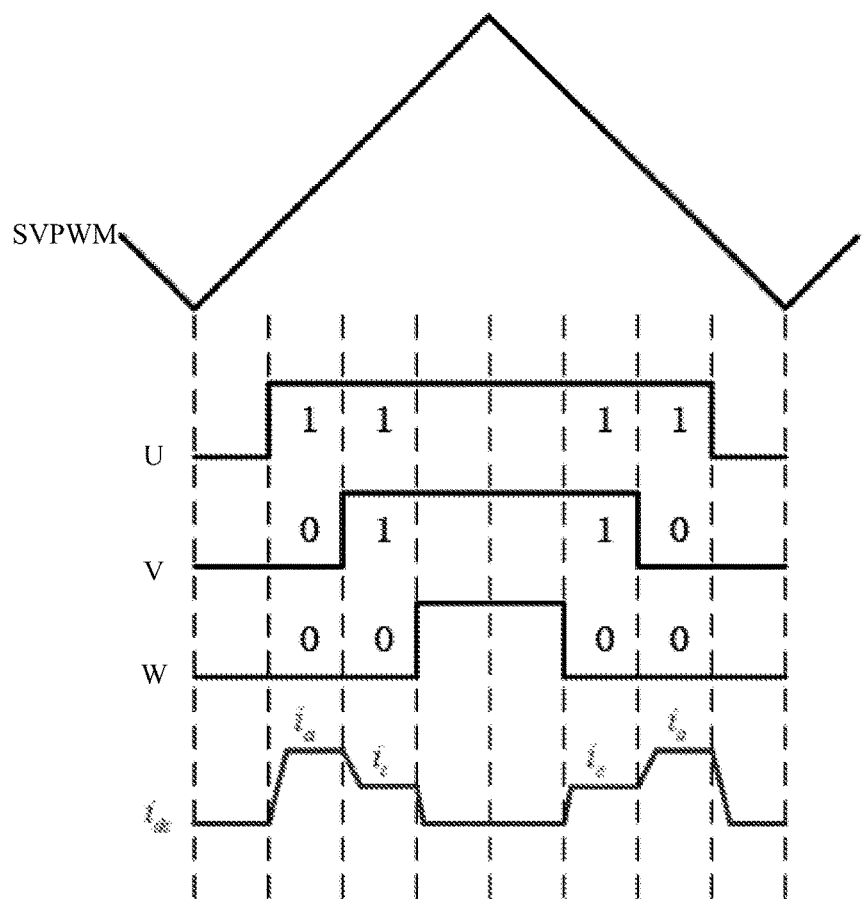
FIG. 3 is a waveform diagram of phase current reconstruction on the basis of a DC bus current according to a specific embodiment of the present disclosure.

In a specific embodiment of the present disclosure, as shown in FIG. 2, in three-phase bridge arms of a, b and c-phases, the a-phase bridge arm may include an upper bridge switch tube T1 and a lower bridge switch tube T2, the b-phase bridge arm may include an upper bridge switch tube T3 and a lower bridge switch tube T4, and the c-phase bridge arm may include an upper bridge switch T5 and a lower bridge switch T6. When the motor is driven by the space vector pulse width modulation (SVPWM) technology, the upper bridge switch tube and lower bridge switch tube of the bridge arm of each phase are different in state. Moreover, for each phase, when the upper bridge switch tube of the bridge arm is on and the lower bridge switch tube of the bridge is off, it refers to "1"; when the upper bridge switch tube of the bridge arm is off and the lower bridge switch tube of the bridge arm is on, it refers to "0", and thus, in this way, six non-zero vectors "001", "010", "011", "100", "101", "110" and two zero vectors "000", "111" can be formed. As shown in FIG. 3, in one SVPWM cycle, there may be two non-zero vectors "100" and "110". At a time corresponding to the vector "100", i.e., when the upper bridge switch T1 is on and the lower bridge switch T2 is off, the upper bridge switch T3 is off and the lower bridge switch T4 is on, and the upper bridge switch T5 is off and the lower bridge switch T6 is on, the sampled DC bus current is the a-phase current, i.e., $i_a = i_{dc1}$, where $i_{dc1}$ represents the DC bus current sampled at this time, and is represents the a-phase current. At a time corresponding to the vector "110", i.e., when the upper bridge switch T1 is on and the lower bridge switch T2 is off, the upper bridge switch T3 is on and the lower bridge switch T4 is off, and the upper bridge switch T5 is off and the lower bridge switch T6 is on, the sampled DC bus current is the c-phase current, i.e., $i_c = i_{dc2}$, where $i_{dc2}$ represents the DC bus current sampled at this time, and is represents the c-phase current. At this time, according to relationship of the three-phase currents, the b-phase current can be calculated, and thus the three-phase current of the motor in one PWM cycle can be acquired.

Similarly, the a-phase current and the b-phase current can be acquired according to the states of the switch tubes and the DC bus currents, and the c-phase current can be calculated according to the relationship of the three-phase current, thus acquiring the three-phase current of the motor in one PWM cycle. Alternatively, the b-phase current and the c-phase current can be acquired according to the states of the switch tubes and the DC bus currents, and the a-phase current can be calculated according to the relationship of the three-phase current, thus acquiring the three-phase current of the motor in one PWM cycle.

In S2, during the phase current reconstruction, two sampled currents of each PWM cycle are acquired as a two-phase current of the motor and a command voltage or a sampled voltage is acquired.

In S3, synchronous conversion is performed on the two sampled currents and the command voltage or the sampled voltage to allow a current vector and a voltage vector, that are input to a flux observer, to keep synchronous.

In an embodiment of the present disclosure, the synchronous conversion is performed on the two sampled currents and the command voltage or the sampled voltage in a manner (1), i.e., by simultaneously converting the two sampled currents into two currents at a time corresponding to the command voltage or the sampled voltage.

Figure 4:
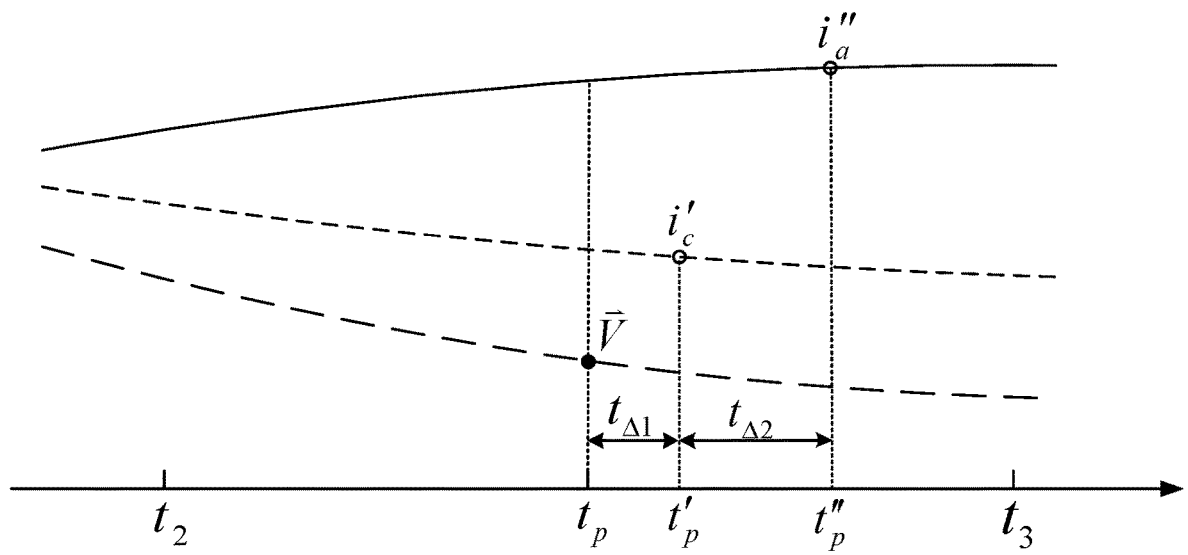
FIG. 4 is a schematic diagram of a sampled current vector, a command voltage vector or a sampled voltage vector corresponding to any time according to a specific embodiment of the present disclosure.

In a specific embodiment of the present disclosure, the two sampled currents correspond to the c-phase current and the a-phase current. As shown in FIG. 4, $t_3-t_2$ represents a cycle of the PWM carrier wave ($t_3,t_2$, respectively, corresponds to a valley of the PWM carrier wave), a time $t_p$, represents a time corresponding to the command voltage or the sampled voltage ($t_p$ is a midpoint between $t_2$ and $t_3$, i.e., corresponds to a peak of the PWM carrier wave), a time $t'_p$ represents a time corresponding to the c-phase current, a time $t''_p$ represents a time corresponding to the a-phase current, $t_{A1}$ represents a time difference between the time corresponding to the command voltage or the sampled voltage and the time corresponding to the c-phase current, and $t_{A2}$ represents a time difference between the time corresponding to the c-phase current and the time corresponding to the a-phase current.

A current vector at the time $t_p$ is defined as follows:

$$\bar{I} = I \cdot e^{j\theta_I}, \quad (1)$$

$$\begin{bmatrix} i_\alpha \\ i_\beta \end{bmatrix} = \begin{bmatrix} I\cos\theta_I \\ I\sin\theta_I \end{bmatrix}, \quad (2)$$

where $\bar{I}$ represents the current vector at the time $t_p$, I represents an amplitude of the current vector $\bar{I}$, $\theta_I$ represents an angle of the current vector at the time $t_p$, and $i_\alpha, i_\beta$ represent currents in a two-phase stationary coordinate system, respectively.

A current vector at the time $t'_p$ is defined as follows:

$$\bar{I}' = I \cdot e^{j\theta'_I}, \quad (3)$$

$$\begin{bmatrix} i'_\alpha \\ i'_\beta \end{bmatrix} = \begin{bmatrix} I\cos\theta'_I \\ I\sin\theta'_I \end{bmatrix}, \quad (4)$$

where $\bar{I}'$ represents the current vector at the time $t'_p$, $\theta'_I$ represents an angle of the current vector at the time $t'_p$, and i'$_\alpha$, i'$_\beta$ represent currents at the time corresponding to the c-phase current in the two-phase stationary coordinate system, respectively.

A current vector at the time t"$_p$ is defined as follows:

$$\vec{I}'' = I \cdot e^{j\theta''_I}, \tag{5}$$

$$\begin{bmatrix} i''_\alpha \\ i''_\beta \end{bmatrix} = \begin{bmatrix} I\cos\theta''_I \\ I\sin\theta''_I \end{bmatrix}, \tag{6}$$

where $\vec{I}''$ represents the current vector at the time t"$_p$, $\theta''_I$ represents an angle of the current vector at the time t"$_p$, and i"$_\alpha$, i"$_\beta$ represent currents at the time corresponding to the a-phase current in the two-phase stationary coordinate system, respectively.

It should be noted that a difference between the angle $\theta_I$ of the current vector at the time $t_p$ and the angle $\theta'_I$ of the current vector at the time t'$_p$ is $\omega_e t_{\Delta 1}$, i.e., $\theta'_I = \theta_I + \omega_e t_{\Delta 1}$, and a difference between the angle $\theta'_I$ of the current vector at the time t'$_p$ and the angle $\theta''_I$ of the current vector at the time t"$_p$ is $\omega_e t_{\Delta 2}$, i.e. $\theta''_I = \theta'_I + \omega_e t_{\Delta 2}$, where $\omega_e$ represents an electrical angular frequency.

Therefore, the c-phase current and the a-phase current can be expressed by the following formulas:

$$i''_a = i''_a, \tag{7-1}$$

$$\begin{aligned} i'_c &= I\cos(\theta'_I + 2\pi/3) \\ &= I\cos(\theta''_I - \omega_e t_{\Delta 2} + 2\pi/3) \\ &= I\cos\theta''_I \cdot \cos(\omega_e t_{\Delta 2} - 2\pi/3) + I\sin\theta''_I \cdot \sin(\omega_e t_{\Delta 2} - 2\pi/3) \\ &= i''_\alpha \cdot \cos(\omega_e t_{\Delta 2} - 2\pi/3) + i''_\beta \cdot \sin(\omega_e t_{\Delta 2} - 2\pi/3), \end{aligned} \tag{7-2}$$

where $t_{\Delta 2}$ represents the time difference between the time corresponding to the c-phase current and the time corresponding to the a-phase current, $\omega_e$ represents the electrical angular frequency, and i"$_a$, i'$_c$ represent the a-phase current and the c-phase current, respectively.

By processing the formulas (7-1) and (7-2), the current vector $\vec{I}''$ at the time t"$_p$ may be calculated as follows:

$$\vec{I}'' = \begin{bmatrix} i''_\alpha \\ i''_\beta \end{bmatrix} = \begin{bmatrix} i''_a \\ \dfrac{i'_c - i''_a \cos(\omega_e t_{\Delta 2} - 2\pi/3)}{\sin(\omega_e t_{\Delta 2} - 2\pi/3)} \end{bmatrix}. \tag{8}$$

According to the formulas (1), (3) and (5), it can be acquired that $\vec{I}'' = I \cdot e^{j\theta''} = I \cdot e^{j(\theta'_I + \omega_e t_{\Delta 2})} = I \cdot e^{j(\theta_I + \omega_e t_{\Delta 1} + \omega_e t_{\Delta 2})} = \vec{I} \cdot e^{j\omega_e(t_{\Delta 1} + t_{\Delta 2})}$, that is, it can be acquired that $\vec{I} = \vec{I}'' \cdot e^{-j\omega_e(t_{\Delta 1} + t_{\Delta 2})}$. In combination with the formula (8), it can be acquired that $$\vec{I} = \begin{bmatrix} i_\alpha \\ i_\beta \end{bmatrix} = \begin{bmatrix} i''_a \cdot \cos(\omega_e(t_{\Delta 1} + t_{\Delta 2})) + \dfrac{i'_c - i''_a \cos(\omega_e t_{\Delta 2} - 2\pi/3)}{\sin(\omega_e t_{\Delta 2} - 2\pi/3)} \cdot \sin(\omega_e(t_{\Delta 1} + t_{\Delta 2})) \\ \dfrac{i'_c - i''_a \cos(\omega_e t_{\Delta 2} - 2\pi/3)}{\sin(\omega_e t_{\Delta 2} - 2\pi/3)} \cdot \cos(\omega_e(t_{\Delta 1} + t_{\Delta 2})) - i''_a \cdot \sin(\omega_e(t_{\Delta 1} + t_{\Delta 2})) \end{bmatrix}. \tag{9}$$

Therefore, when i"$_a$, i'$_c$ are known, that is, the c-phase current and the a-phase current are acquired by the sampling, the current vector at the time $t_p$, can be calculated, that is, the current vector at the time corresponding to the command voltage or the sampled voltage is acquired, to allow the current vector and the voltage vector input to the flux observer to be at the same time, thus improving the accuracy of the angle output by the flux observer and allowing the motor to run normally.

In another embodiment of the present disclosure, the two sampled currents may also correspond to the c-phase current and the b-phase current, and by similar processes, it can be acquired that $$\begin{aligned} i'_c &= I\cos(\theta'_I + 2\pi/3) \\ &= I\cos(\theta_I + \omega_e t_{\Delta 1} + 2\pi/3) \\ &= I\cos\theta_I\cos(\omega_e t_{\Delta 1} + 2\pi/3) - I\sin\theta_I\sin(\omega_e t_{\Delta 1} + 2\pi/3) \\ &= i_\alpha\cos(\omega_e t_{\Delta 1} + 2\pi/3) - i_\beta\sin(\omega_e t_{\Delta 1} + 2\pi/3), \end{aligned} \tag{10-1}$$

$$\begin{aligned} i''_b &= I\cos(\theta''_I + 2\pi/3) \\ &= I\cos(\theta_I + \omega_e t_{\Delta 1} + \omega_e t_{\Delta 2} - 2\pi/3) \\ &= I\cos\theta_I\cos(\omega_e t_{\Delta 1} + \omega_e t_{\Delta 2} - 2\pi/3) - \\ &\quad I\sin\theta_I\sin(\omega_e t_{\Delta 1} + \omega_e t_{\Delta 2} - 2\pi/3) \\ &= i_\alpha\cos(\omega_e t_{\Delta 1} + \omega_e t_{\Delta 2} - 2\pi/3) - i_\beta\sin(\omega_e t_{\Delta 1} + \omega_e t_{\Delta 2} - 2\pi/3), \end{aligned} \tag{10-2}$$

where i'$_c$, i"$_b$ represent the c-phase current and the b-phase current, respectively, $\theta_I$ represents an angle of the current vector at the time corresponding to the command voltage or sampled voltage, $\theta'_I$ represents an angle of the current vector at the time corresponding to the c-phase current, $\theta''_I$ represents an angle of the current vector at the time corresponding to the b-phase current, an angle difference between $\theta_I$ and $\theta'_I$ is $\omega_e t_{\Delta 1}$, i.e., $\theta'_I = \theta_I + \omega_e t_{\Delta 1}$, an angle difference between $\theta'_I$ and $\theta''_I$ is $\omega_e t_{\Delta 2}$, i.e., $\theta''_I = \theta'_I + \omega_e t_{\Delta 2}$, $\omega_e$ represents the electrical angular frequency, and $i_\alpha, i_\beta$ represent currents in the two-phase stationary coordinate system, respectively.

By processing the formulas (10-1) and (10-2), it can be acquired that $$i_\beta = \frac{i_\alpha\cos(\omega_e t_{\Delta 1} + 2\pi/3) - i'_c}{\sin(\omega_e t_{\Delta 1} + 2\pi/3)} = \frac{i_\alpha\cos(\omega_e t_{\Delta 1} + \omega_e t_{\Delta 2} - 2\pi/3) - i''_b}{\sin(\omega_e t_{\Delta 1} + \omega_e t_{\Delta 2} - 2\pi/3)}. \tag{11}$$

Moreover, by processing the formula (11), it can be acquired that $$\begin{aligned} &i_\alpha \sin(\omega_e t_{\Delta 1} + \omega_e t_{\Delta 2} - 2\pi/3)\cos(\omega_e t_{\Delta 1} + 2\pi/3) - \\ &\quad i'_c \sin(\omega_e t_{\Delta 1} + \omega_e t_{\Delta 2} - 2\pi/3) = \\ &i_\alpha \cos(\omega_e t_{\Delta 1} + \omega_e t_{\Delta 2} - 2\pi/3)\sin(\omega_e t_{\Delta 1} + 2\pi/3) - \\ &\quad i''_b \sin(\omega_e t_{\Delta 1} + 2\pi/3) \Leftrightarrow i_\alpha = \\ &\dfrac{i'_c \sin(\omega_e t_{\Delta 1} + \omega_e t_{\Delta 2} - 2\pi/3) - i''_b \sin(\omega_e t_{\Delta 1} + 2\pi/3)}{\sin(\omega_e t_{\Delta 2} - 4\pi/3)}. \end{aligned} \tag{12}$$

In addition, by processing the formulas (10-1) and (10-2), it can be further acquired that $$i_\alpha = \frac{i'_c + i_\beta\sin(\omega_e t_{\Delta 1} + 2\pi/3)}{\cos(\omega_e t_{\Delta 1} + 2\pi/3)} = \frac{i''_b + i_\beta\sin(\omega_e t_{\Delta 1} + \omega_e t_{\Delta 2} - 2\pi/3)}{\cos(\omega_e t_{\Delta 1} + \omega_e t_{\Delta 2} - 2\pi/3)}. \tag{13}$$

Further, by processing the formula (13), it can be acquired that $$i'_c \cos(\omega_e t_{\Delta 1} + \omega_e t_{\Delta 2} - 2\pi/3) + \quad (14)$$
$$i_\beta \sin(\omega_e t_{\Delta 1} + 2\pi/3)\cos(\omega_e t_{\Delta 1} + \omega_e t_{\Delta 2} - 2\pi/3) =$$
$$i''_b \cos(\omega_e t_{\Delta 1} + 2\pi/3) +$$
$$i_\beta \cos(\omega_e t_{\Delta 1} + 2\pi/3)\sin(\omega_e t_{\Delta 1} + \omega_e t_{\Delta 2} - 2\pi/3) \Leftrightarrow i_\beta =$$
$$\frac{i'_c \cos(\omega_e t_{\Delta 1} + \omega_e t_{\Delta 2} - 2\pi/3) - i''_b \cos(\omega_e t_{\Delta 1} + 2\pi/3)}{\sin(\omega_e t_{\Delta 2} - 4\pi/3)}.$$

The following formula can be acquired according to the formulas (12) and (14):

$$\vec{I} = \begin{bmatrix} i_\alpha \\ i_\beta \end{bmatrix} = \begin{bmatrix} \dfrac{i'_c \sin(\omega_e t_{\Delta 1} + \omega_e t_{\Delta 2} - 2\pi/3) - i''_b \sin(\omega_e t_{\Delta 1} + 2\pi/3)}{\sin(\omega_e t_{\Delta 2} - 4\pi/3)} \\ \dfrac{i'_c \cos(\omega_e t_{\Delta 1} + \omega_e t_{\Delta 2} - 2\pi/3) - i''_b \cos(\omega_e t_{\Delta 1} + 2\pi/3)}{\sin(\omega_e t_{\Delta 2} - 4\pi/3)} \end{bmatrix}. \quad (15)$$

Therefore, when $i'_c, i''_b$ are known, that is, the c-phase current and the b-phase current are acquired by the sampling, the current vector at the time corresponding to the command voltage or the sampled voltage can be calculated, so as to allow the current vector and the voltage vector input to the flux observer to be at the same time, thus improving the accuracy of the angle output by the flux observer and allowing the motor to run normally.

The two sampled currents may also correspond to the a-phase current and the b-phase current, and by similar processes, it can be acquired that $$i'_b = I\cos(\theta'_I - 2\pi/3) \quad (16\text{-}1)$$
$$= I\cos(\theta_I + \omega_e t_{\Delta 1} - 2\pi/3)$$
$$= I\cos\theta_I \cos(\omega_e t_{\Delta 1} - 2\pi/3) - I\sin\theta_I \sin(\omega_e t_{\Delta 1} - 2\pi/3)$$
$$= i_\alpha \cos(\omega_e t_{\Delta 1} - 2\pi/3) - i_\beta \sin(\omega_e t_{\Delta 1} - 2\pi/3),$$

$$i''_a = I\cos\theta''_I \quad (16\text{-}2)$$
$$= I\cos(\theta_I + \omega_e t_{\Delta 1} + \omega_e t_{\Delta 2})$$
$$= I\cos\theta_I \cos(\omega_e t_{\Delta 1} + \omega_e t_{\Delta 2}) - I\sin\theta_I \sin(\omega_e t_{\Delta 1} + \omega_e t_{\Delta 2})$$
$$= i_\alpha \cos(\omega_e t_{\Delta 1} + \omega_e t_{\Delta 2}) - i_\beta \sin(\omega_e t_{\Delta 1} + \omega_e t_{\Delta 2}),$$

where $i''_a, i'_b$ represent the a-phase current and the b-phase current, respectively, $\theta_I$ represents the angle of the current vector at the time corresponding to the command voltage or sampled voltage, $\theta'_I$ represents an angle of the current vector at the time corresponding to the b-phase current, $\theta''_I$ represents an angle of the current vector at the time corresponding an angle difference between $\theta'_I$ and $\theta''_I$ is $\omega_e t_{\Delta 2}$, i.e., $\theta''_I = \theta'_I + \omega_e t_{\Delta 1}$, to the a-phase current, and angle difference between $\theta_I$ and $\theta'_I$ is $\omega_e^t{}_{\Delta 1}$, i.e., $\theta'_I = \theta_I + \omega_e^t{}_{\Delta 1}$, an angle difference $\theta'_I$ and $\theta''_I$ is $\omega_e t_{\Delta 2}$, i.e., $\theta''_I = \theta'_I + \omega_e^t{}_{\Delta 2}$, $\omega_e$ represents the electrical angular frequency, and $i_\alpha, i_\beta$ represent currents in the two-phase stationary coordinate system, respectively.

By processing the formulas (16-1) and (16-2), it can be acquired that $$i_\beta = \frac{i_\alpha \cos(\omega_e t_{\Delta 1} - 2\pi/3) - i'_b}{\sin(\omega_e t_{\Delta 1} - 2\pi/3)} = \frac{i_\alpha \cos(\omega_e t_{\Delta 1} + \omega_e t_{\Delta 2}) - i''_a}{\sin(\omega_e t_{\Delta 1} + \omega_e t_{\Delta 2})}. \quad (17)$$

Moreover, by processing the formula (17), it can be acquired that $$i_\alpha \sin(\omega_e t_{\Delta 1} - 2\pi/3)\cos(\omega_e t_{\Delta 1} + \omega_e t_{\Delta 2}) - i''_a \sin(\omega_e t_{\Delta 1} - 2\pi/3) = \quad (18)$$
$$i_\alpha \cos(\omega_e t_{\Delta 1} - 2\pi/3)\sin(\omega_e t_{\Delta 1} + \omega_e t_{\Delta 2}) - i'_b \sin(\omega_e t_{\Delta 1} + \omega_e t_{\Delta 2}) \Leftrightarrow$$
$$i_\alpha = \frac{i'_b \sin(\omega_e t_{\Delta 1} + \omega_e t_{\Delta 2}) - i''_a \sin(\omega_e t_{\Delta 1} - 2\pi/3)}{\sin(\omega_e t_{\Delta 2} + 2\pi/3)}.$$

In addition, by processing the formulas (16-1) and (16-2), it can be further acquired that $$i_\alpha = \frac{i'_b + i_\beta \sin(\omega_e t_{\Delta 1} - 2\pi/3)}{\cos(\omega_e t_{\Delta 1} - 2\pi/3)} = \frac{i''_a + i_\beta \sin(\omega_e t_{\Delta 1} + \omega_e t_{\Delta 2})}{\cos(\omega_e t_{\Delta 1} + \omega_e t_{\Delta 2})}. \quad (19)$$

Further, by processing the formula (19), it can be acquired that $$i'_b \cos(\omega_e t_{\Delta 1} + \omega_e t_{\Delta 2}) + i_\beta \sin(\omega_e t_{\Delta 1} - 2\pi/3)\cos(\omega_e t_{\Delta 1} + \omega_e t_{\Delta 2}) = \quad (20)$$
$$i''_a \cos(\omega_e t_{\Delta 1} - 2\pi/3) + i_\beta \cos(\omega_e t_{\Delta 1} - 2\pi/3)\sin(\omega_e t_{\Delta 1} + \omega_e t_{\Delta 2}) \Leftrightarrow$$
$$i_\beta = \frac{i'_b \cos(\omega_e t_{\Delta 1} + \omega_e t_{\Delta 2}) - i''_a \cos(\omega_e t_{\Delta 1} - 2\pi/3)}{\sin(\omega_e t_{\Delta 2} + 2\pi/3)}.$$

The following formula can be acquired according to the formulas (18) and (20):

$$\vec{I} = \begin{bmatrix} i_\alpha \\ i_\beta \end{bmatrix} = \begin{bmatrix} \dfrac{i'_b \sin(\omega_e t_{\Delta 1} + \omega_e t_{\Delta 2}) - i''_a \sin(\omega_e t_{\Delta 1} - 2\pi/3)}{\sin(\omega_e t_{\Delta 2} + 2\pi/3)} \\ \dfrac{i'_b \cos(\omega_e t_{\Delta 1} + \omega_e t_{\Delta 2}) - i''_a \cos(\omega_e t_{\Delta 1} - 2\pi/3)}{\sin(\omega_e t_{\Delta 2} + 2\pi/3)} \end{bmatrix}. \quad (21)$$

Therefore, when $i''_a, i'_b$ are known, that is, the a-phase current and the b-phase current are acquired by the sampling, the current vector at the time corresponding to the command voltage or the sampled voltage can be calculated, so as to allow the current vector and the voltage vector input to the flux observer to be at the same time, thus improving the accuracy of the angle output by the flux observer and allowing the motor to run normally.

In an embodiment of the present disclosure, the synchronous conversion is performed on the two sampled currents and the command voltage or the sampled voltage in manner (2), i.e., by simultaneously converting one of the two sampled currents and the command voltage or the sampled voltage into a current and a voltage at a time corresponding to the other one of the two sampled currents.

In a specific embodiment of the present disclosure, the two sampled currents correspond to the c-phase current and the a-phase current. As shown in FIG. 4, $t_3-t_2$ represents a cycle of the PWM carrier wave ($t_3,t_2$, respectively, corresponds to a valley of the PWM carrier wave), a time $t_p$ represents a time corresponding to the command voltage or the sampled voltage ($t_p$ is a midpoint between $t_2$ and $t_3$, i.e., corresponds to a peak of the PWM carrier wave), a time $t'_p$ represents a time corresponding to the c-phase current, a time $t''_p$ represents a time corresponding to the a-phase current, $t_{\Delta 1}$ represents a time difference between the time corresponding to the command voltage or the sampled voltage and the time corresponding to the c-phase current, and $t_{\Delta 2}$ represents a time difference between the time corresponding to the c-phase current and the time corresponding to the a-phase current.

A current vector at the time $t_p$ is defined as follows:

$$\vec{I} = I \cdot e^{j\theta_I}, \tag{22}$$

$$\begin{bmatrix} i_\alpha \\ i_\beta \end{bmatrix} = \begin{bmatrix} I\cos\theta_I \\ I\sin\theta_I \end{bmatrix}, \tag{23}$$

where $\vec{I}$ represents the current vector at the time $t_p$, I represents an amplitude of the current vector $\vec{I}$, $\theta_I$ represents an angle of the current vector at the time $t_p$, and $i_\alpha, i_\beta$ represent currents in a two-phase stationary coordinate system, respectively.

A voltage vector at the time $t_p$ is defined as follows:

$$\vec{V} = V \cdot e^{j\theta_V}, \tag{24}$$

$$\begin{bmatrix} v_\alpha \\ v_\beta \end{bmatrix} = \begin{bmatrix} V\cos\theta_V \\ V\sin\theta_V \end{bmatrix}, \tag{25}$$

where $\vec{V}$ represents the voltage vector at the time $t_p$, V represents an amplitude of the voltage vector $\vec{V}$, $\theta_V$ represents an angle of the voltage vector at the time $t_p$, and $v_\alpha, v_\beta$ represent voltages in the two-phase stationary coordinate system, respectively.

A current vector at the time $t'_p$ is defined as follows:

$$\vec{I}' = I \cdot e^{j\theta'_I}, \tag{26}$$

$$\begin{bmatrix} i'_\alpha \\ i'_\beta \end{bmatrix} = \begin{bmatrix} I\cos\theta'_I \\ I\sin\theta'_I \end{bmatrix}, \tag{27}$$

where $\vec{I}'$ represents the current vector at the time $t'_p$, $\theta'_I$ represents an angle of the current vector at the time $t'_p$, and $v_\alpha, i'_\beta$ represent currents at the time corresponding to the c-phase current in the two-phase stationary coordinate system, respectively.

A voltage vector at the time $t'_p$ is defined as follows:

$$(\vec{V})' = V \cdot e^{j\theta'_V}, \tag{28}$$

$$\begin{bmatrix} v'_\alpha \\ v'_\beta \end{bmatrix} = \begin{bmatrix} V\cos\theta'_V \\ V\sin\theta'_V \end{bmatrix}, \tag{29}$$

where $\vec{V}'$ represents the voltage vector at the time $t'_p$, $\theta'_V$ represents an angle of the voltage vector at the time $t'_p$, and $v'_\alpha, v'_\beta$ represent voltages at the time corresponding to the c-phase current in the two-phase stationary coordinate system, respectively.

A current vector at the time $t''_p$ is defined as follows:

$$\vec{I}'' = I \cdot e^{j\theta''_I}, \tag{30}$$

$$\begin{bmatrix} i''_\alpha \\ i''_\beta \end{bmatrix} = \begin{bmatrix} I\cos\theta''_I \\ I\sin\theta''_I \end{bmatrix}, \tag{31}$$

where $\vec{I}''$ represents the current vector at the time $t''_p$, $\theta''_I$ represents an angle of the current vector at the time $t''_p$, and $i''_\alpha, i''_\beta$ represent currents at the time corresponding to the a-phase current in the two-phase stationary coordinate system, respectively.

A voltage vector at the time $t''_p$ is defined as follows:

$$\vec{V}'' = V \cdot e^{j\theta''_V}, \tag{32}$$

$$\begin{bmatrix} v''_\alpha \\ v''_\beta \end{bmatrix} = \begin{bmatrix} V\cos\theta''_V \\ V\sin\theta''_V \end{bmatrix}, \tag{33}$$

where $\vec{V}''$ represents the voltage vector at the time $t''_p$, $\theta''_V$ represents an angle of the voltage vector at the time $t''_p$, and $v''_\alpha, v''_\beta$ represent voltages at the time corresponding to the a-phase current in the two-phase stationary coordinate system, respectively.

It should be noted that a difference between the angle $\theta_I$ of the current vector at the time $t_p$ and the angle $\theta'_I$ of the current vector at the time $t'_p$ is $\omega_e t_{\Delta 1}$, i.e., $\theta'_I = \theta_I + \omega_e t_{\Delta 1}$, a difference between the angle $\theta_V$ of the voltage vector at the time $t_p$ and the angle $\theta'_V$ of the voltage vector at the time $t'_p$ is $\omega_e t_{\Delta 1}$, i.e., $\theta'_V = \theta_V + \omega_e^t{}_{\Delta 1}$, a difference between the angle $\theta'_I$ of the current vector at the time $t'_p$ and the angle $\theta''_I$ of the current vector at the time $t''_p$ is $\omega_e t_{\Delta 2}$, i.e., $\theta''_I = \theta'_I + \omega_e^t{}_{\Delta 2}$, and a difference between the angle $\theta'_V$ of the voltage vector at the time $t'_p$ and the angle $\theta''_V$ of the voltage vector at the $t''_p$ is $\omega_e t_{\Delta 2}$, i.e., $\theta''_V = \theta'_V + \omega_e t_{\Delta 2}$, where $\omega_e$ represents an electrical angular frequency.

Therefore, the voltage vector $\vec{V}''$ at the time $t''_p$ may be calculated according to the voltage vector $\vec{V}$ at the time $t_p$ with the following formulas:

$$\vec{V}'' = \tag{34}$$
$$V \cdot e^{j\theta''_V} = V \cdot e^{j(\theta'_V + \omega_e t_{\Delta 2})} = V \cdot e^{j(\theta_V + \omega_e t_{\Delta 1} + \omega_e t_{\Delta 2})} = \vec{V} \cdot e^{j\omega_e(t_{\Delta 1} + t_{\Delta 2})},$$

$$\vec{V} = \begin{bmatrix} v_\alpha \\ v_\beta \end{bmatrix}. \tag{35}$$

By processing the formulas (34) and (35), the voltage vector $\vec{V}''$ at the time $t''_p$ is acquired as:

$$\vec{V}'' = \begin{bmatrix} v''_\alpha \\ v''_\beta \end{bmatrix} = \begin{bmatrix} v_\alpha \cos(\omega_e(t_{\Delta 1} + t_{\Delta 2})) - v_\beta \sin(\omega_e(t_{\Delta 1} + t_{\Delta 2})) \\ v_\beta \cos(\omega_e(t_{\Delta 1} + t_{\Delta 2})) + v_\alpha \sin(\omega_e(t_{\Delta 1} + t_{\Delta 2})) \end{bmatrix}. \tag{36}$$

When $v_\alpha, v_\beta$ are known, i.e., the command voltage or the sampled voltage is acquired, the voltage vector $\vec{V}''$ at the time $t''_p$ can be calculated.

Further, it is known from the manner (1) that when the two sampled currents correspond to the c-phase current and the a-phase current, the current vector $\vec{I}''$ at the time $t''_p$ can be calculated as:

$$\vec{I}'' = \begin{bmatrix} i''_\alpha \\ i''_\beta \end{bmatrix} = \begin{bmatrix} i''_a \\ \frac{i'_c - i''_a \cos(\omega_e t_{\Delta 2} - 2\pi/3)}{\sin(\omega_e t_{\Delta 2} - 2\pi/3)} \end{bmatrix}. \quad (37)$$

When $i''_a, i'_c$ are known, i.e., the c-phase current and the a-phase current are acquired by the sampling, the current vector $\vec{I}''$ at the time $t''_p$ can be calculated.

Therefore, after the synchronous conversion is performed on the two sampled currents (the c-phase current and the a-phase current) and the command voltage or the sampled voltage, the voltage vector $\vec{V}''$ and the current vector $\vec{I}''$ at the time $t''_p$, i.e., the voltage vector $\vec{V}''$ and the current vector $\vec{I}''$ at the time corresponding to the a-phase current, can be acquired, so as to allow the current vector and the voltage vector input to the flux observer to be at the same time, thus improving the accuracy of the angle output by the flux observer and allowing the motor to run normally.

In another embodiment of the present disclosure, the two sampled currents may also correspond to the c-phase current and the b-phase current, and by similar processes, the voltage vector $\vec{V}''$ at the time $t''_p$ may be acquired as:

$$\vec{V}'' = \begin{bmatrix} v''_\alpha \\ v''_\beta \end{bmatrix} = \begin{bmatrix} v_\alpha \cos(\omega_e(t_{\Delta 1} + t_{\Delta 2})) - v_\beta \sin(\omega_e(t_{\Delta 1} + t_{\Delta 2})) \\ v_\beta \cos(\omega_e(t_{\Delta 1} + t_{\Delta 2})) + v_\alpha \sin(\omega_e(t_{\Delta 1} + t_{\Delta 2})) \end{bmatrix}. \quad (38)$$

Moreover, the following formulas are acquired:

$$\begin{aligned} i'_c &= I\cos(\theta'_1 + 2\pi/3) \\ &= I\cos(\theta''_1 - \omega_e t_{\Delta 2} + 2\pi/3) \\ &= I\cos\theta''_1 \cos(-\omega_e t_{\Delta 2} - 2\pi/3) - I\sin\theta''_1 \sin(-\omega_e t_{\Delta 2} + 2\pi/3) \\ &= I\cos\theta''_1 \cos(\omega_e t_{\Delta 2} - 2\pi/3) + I\sin\theta''_1 \sin(\omega_e t_{\Delta 2} - 2\pi/3) \\ &= i''_\alpha \cos(\omega_e t_{\Delta 2} - 2\pi/3) + i''_\beta \sin(\omega_e t_{\Delta 2} - 2\pi/3), \end{aligned} \quad (39\text{-}1)$$

$$\begin{aligned} i''_b &= I\cos(\theta''_1 - 2\pi/3) \\ &= I\cos\theta''_1 \cos(2\pi/3) + I\sin\theta''_1 \sin(2\pi/3) \\ &= i''_\alpha \cos(2\pi/3) + i''_\beta \sin(2\pi/3). \end{aligned} \quad (39\text{-}2)$$

By processing the formulas (39-1) and (39-2), it can be acquired that $$i''_\beta = \frac{i'_c - i''_\alpha \cos(\omega_e t_{\Delta 2} - 2\pi/3)}{\sin(\omega_e t_{\Delta 2} - 2\pi/3)} = \frac{i''_b - i''_\alpha \cos(2\pi/3)}{\sin(2\pi/3)}. \quad (40)$$

Moreover, by processing the formula (40), it can be acquired that $$i'_c \sin(2\pi/3) - i''_\alpha \cos(\omega_e t_{\Delta 2} - 2\pi/3)\sin(2\pi/3) = \quad (41)$$
$$i''_b \sin(\omega_e t_{\Delta 2} - 2\pi/3) - i''_\alpha \sin(\omega_e t_{\Delta 2} - 2\pi/3)\cos(2\pi/3) \Leftrightarrow i''_\alpha =$$
$$\frac{i''_b \sin(\omega_e t_{\Delta 2} - 2\pi/3) - i'_c \sin(2\pi/3)}{\sin(\omega_e t_{\Delta 2} - 4\pi/3)}.$$

In addition, by processing the formulas (39-1) and (39-2), it can be further acquired that $$i''_\alpha = \frac{i'_c - i''_\beta \sin(\omega_e t_{\Delta 2} - 2\pi/3)}{\cos(\omega_e t_{\Delta 2} - 2\pi/3)} = \frac{i''_b - i''_\beta \sin(2\pi/3)}{\cos(2\pi/3)}. \quad (42)$$

Moreover, by processing the formula (42), it can be acquired that $$i'_c \cos(2\pi/3) - i''_\beta \sin(\omega_e t_{\Delta 2} - 2\pi/3)\cos(2\pi/3) = \quad (43)$$
$$i''_b \cos(\omega_e t_{\Delta 2} - 2\pi/3) - i''_\beta \cos(\omega_e t_{\Delta 2} - 2\pi/3)\sin(2\pi/3) \Leftrightarrow i''_\beta =$$
$$\frac{i'_c \cos(2\pi/3) - i''_b \cos(\omega_e t_{\Delta 2} - 2\pi/3)}{\sin(\omega_e t_{\Delta 2} - 4\pi/3)}.$$

The following formula can be acquired according to the formulas (41) and (43):

$$\vec{I}'' = \begin{bmatrix} i''_\alpha \\ i''_\beta \end{bmatrix} = \begin{bmatrix} \frac{i''_b \sin(\omega_e t_{\Delta 2} - 2\pi/3) - i'_c \sin(2\pi/3)}{\sin(\omega_e t_{\Delta 2} - 4\pi/3)} \\ \frac{i'_c \cos(2\pi/3) - i''_b \cos(\omega_e t_{\Delta 2} - 2\pi/3)}{\sin(\omega_e t_{\Delta 2} - 4\pi/3)} \end{bmatrix}. \quad (44)$$

Therefore, when $i''_c, i''_b$ are known, i.e., the c-phase current and the b-phase current are acquired by the sampling, the voltage vector $\vec{V}''$ and the current vector $\vec{I}''$ at the time $t''_p$, i.e., the voltage vector $\vec{V}''$ and the current vector $\vec{I}''$ at the time corresponding to the b-phase current, can be calculated, so as to allow the current vector and the voltage vector input to the flux observer to be at the same time, thus improving the accuracy of the angle output by the flux observer and allowing the motor to run normally.

The two sampled currents may also correspond to the a-phase current and the b-phase current, and by similar processes, it can be acquired that $$\vec{V}'' = \begin{bmatrix} v''_\alpha \\ v''_\beta \end{bmatrix} = \begin{bmatrix} v_\alpha \cos(\omega_e(t_{\Delta 1} + t_{\Delta 2})) - v_\beta \sin(\omega_e(t_{\Delta 1} + t_{\Delta 2})) \\ v_\beta \cos(\omega_e(t_{\Delta 1} + t_{\Delta 2})) + v_\alpha \sin(\omega_e(t_{\Delta 1} + t_{\Delta 2})) \end{bmatrix}. \quad (45)$$

Moreover, it can be acquired that $$\begin{aligned} i''_b &= I\cos(\theta'_1 - 2\pi/3) \quad (46\text{-}1)\\ &= I\cos(\theta''_1 - \omega_e t_{\Delta 2} - 2\pi/3) \\ &= I\cos\theta''_1 \cos(\omega_e(t_{\Delta 2} + 2\pi/3)) + I\sin\theta''_1 \sin(\omega_e t_{\Delta 2} + 2\pi/3) \\ &= i''_\alpha \cos(\omega_e t_{\Delta 2} + 2\pi/3) + i''_\beta \sin(\omega_e t_{\Delta 2} + 2\pi/3), \end{aligned}$$

$$\begin{aligned} i''_a &= I\cos\theta''_1 \quad (46\text{-}2)\\ &= i''_\alpha. \end{aligned}$$

Further, by processing the formulas (46-1) and (46-2), it can be acquired that $$\vec{I}'' = \begin{bmatrix} i''_\alpha \\ i''_\beta \end{bmatrix} = \begin{bmatrix} i''_a \\ \frac{i''_b - i''_a \cos(\omega_e t_{\Delta 2} + 2\pi/3)}{\sin(\omega_e t_{\Delta 2} + 2\pi/3)} \end{bmatrix}. \quad (47)$$

Therefore, when $i''_a, i'_b$, are known, i.e., the a-phase current and the b-phase current are acquired by the sampling, the voltage vector $\vec{V}''$ and the current vector $\vec{I}''$ at the time $t''_p$, i.e., the voltage vector $\vec{V}''$ and the current vector $\vec{I}''$ at the time corresponding to the a-phase current, can be calculated, so as to allow the current vector and the voltage vector input to the flux observer to be at the same time, thus improving the accuracy of the angle output by the flux observer and allowing the motor to run normally.

In an embodiment of the present disclosure, the synchronous conversion is performed on the two sampled currents and the command voltage or the sampled voltage in a manner (3), i.e., by simultaneously converting the two sampled currents and the command voltage or the sampled voltage into two currents and a voltage at a random time in each PWM cycle.

Figure 5:
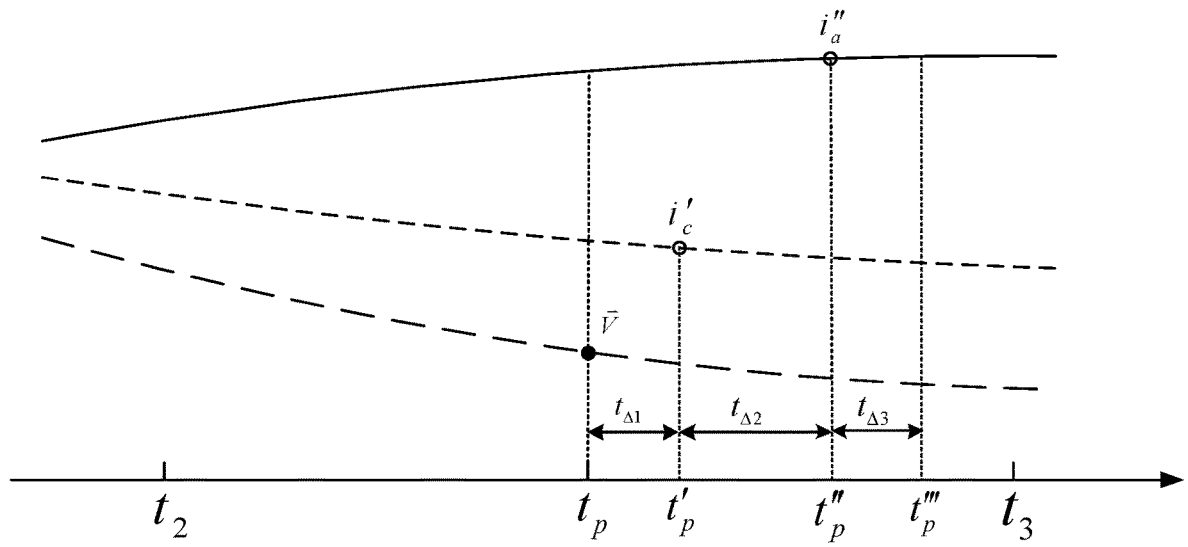
FIG. 5 is a schematic diagram of a sampled current vector, a command voltage vector or a sampled voltage vector corresponding to any time according to another specific embodiment of the present disclosure.

In a specific embodiment of the present disclosure, the two sampled currents correspond to the c-phase current and the a-phase current. As shown in FIG. 5, $t_3$–$t_2$ represents a cycle of the PWM carrier wave ($t_3, t_2$, respectively, corresponds to a valley of the PWM carrier wave), a time $t_p$ represents a time corresponding to the command voltage or the sampled voltage ($t_p$ is a midpoint between $t_2$ and $t_3$, i.e., corresponds to a peak of the PWM carrier wave), a time $t'_p$ represents a time corresponding to the c-phase current, a time $t''_p$ represents a time corresponding to the a-phase current, a time $t'''_p$ represents a random time in a PWM cycle, $t_{\Delta 1}$ represents a time difference between the time corresponding to the command voltage or the sampled voltage and the time corresponding to the c-phase current, $t_{\Delta 2}$ represents a time difference between the time corresponding to the c-phase current and the time corresponding to the a-phase current, and $t_{\Delta 3}$, represents a time difference between the time corresponding to the a-phase current and the random time.

A current vector at the time $t_p$ is defined as follows:

$$\vec{I} = I \cdot e^{j\theta_I}, \quad (48)$$

$$\begin{bmatrix} i_\alpha \\ i_\beta \end{bmatrix} = \begin{bmatrix} I\cos\theta_I \\ I\sin\theta_I \end{bmatrix}, \quad (49)$$

where $\vec{I}$ represents the current vector at the time $t_p$, I represents an amplitude of the current vector $\vec{I}$, $\theta_I$ represents an angle of the current vector at the time $t_p$, and $i_\alpha, i_\beta$ represent currents in a two-phase stationary coordinate system, respectively.

A voltage vector at the time $t_p$ is defined as follows:

$$\vec{V} = V \cdot e^{j\theta_V}, \quad (50)$$

$$\begin{bmatrix} v_\alpha \\ v_\beta \end{bmatrix} = \begin{bmatrix} V\cos\theta_V \\ V\sin\theta_V \end{bmatrix}, \quad (51)$$

where $\vec{V}$ represents the voltage vector at the time $t_p$, V represents an amplitude of the voltage vector $\vec{V}$, $\theta_V$ represents an angle of the voltage vector at the time $t_p$, and $v_\alpha, v_\beta$ represent voltages in the two-phase stationary coordinate system, respectively.

A current vector at the time $t'_p$ is defined as follows:

$$\vec{I}' = I \cdot e^{j\theta'_I}, \quad (52)$$

$$\begin{bmatrix} i'_\alpha \\ i'_\beta \end{bmatrix} = \begin{bmatrix} I\cos\theta'_I \\ I\sin\theta'_I \end{bmatrix}, \quad (53)$$

where $\vec{I}'$ represents the current vector at the time $t'_p$, $\theta'_I$ represents an angle of the current vector at the time $t'_p$, and $i'_\alpha, i'_\beta$ represent currents at the time corresponding to the c-phase current in the two-phase stationary coordinate system, respectively.

A voltage vector at the time $t'_p$ is defined as follows:

$$\vec{V}' = V \cdot e^{j\theta'_V}, \quad (54)$$

$$\begin{bmatrix} v'_\alpha \\ v'_\beta \end{bmatrix} = \begin{bmatrix} V\cos\theta'_V \\ V\sin\theta'_V \end{bmatrix}, \quad (55)$$

where $\vec{V}'$ represents the voltage vector at the time $t'_p$, $\theta'_V$ represents an angle of the voltage vector at the time $t'_p$, and $v'_\alpha, v'_\beta$ represent voltages at the time corresponding to the c-phase current in the two-phase stationary coordinate system, respectively.

A current vector at the time $t''_p$ is defined as follows:

$$\vec{I}'' = I \cdot e^{j\theta''_I}, \quad (56)$$

$$\begin{bmatrix} i''_\alpha \\ i''_\beta \end{bmatrix} = \begin{bmatrix} I\cos\theta''_I \\ I\sin\theta''_I \end{bmatrix}, \quad (57)$$

where $\vec{I}''$ represents the current vector at the time $t''_p$, $\theta''_I$ represents an angle of the current vector at the time $t''_p$, and $i''_\alpha, i''_\beta$ represent currents at the time corresponding to the a-phase current in the two-phase stationary coordinate system, respectively.

A voltage vector at the time $t''_p$ is defined as follows:

$$\vec{V}'' = V \cdot e^{j\theta''_V}, \quad (58)$$

$$\begin{bmatrix} v''_\alpha \\ v''_\beta \end{bmatrix} = \begin{bmatrix} V\cos\theta''_V \\ V\sin\theta''_V \end{bmatrix}, \quad (59)$$

where $\vec{V}''$ represents the voltage vector at the time $t''_p$, $\theta''_V$ represents an angle of the voltage vector at the time $t''_p$, and $v''_\alpha, v''_\beta$ represent voltages at the time corresponding to the a-phase current in the two-phase stationary coordinate system, respectively.

A current vector at the time $t'''_p$ is defined as follows:

$$\vec{I}''' = I \cdot e^{j\theta'''_I}, \quad (60)$$

-continued $$\begin{bmatrix} i'''_\alpha \\ i'''_\beta \end{bmatrix} = \begin{bmatrix} I\cos\theta'''_I \\ I\sin\theta'''_I \end{bmatrix}, \quad (61)$$

where $\vec{I}'''$ represents the current vector at the time $t'''_p$, $\theta'''_I$ represents an angle of the current vector at the time $t'''_p$, and $i'''_\alpha, i'''_\beta$ represent currents at the random time in the two-phase stationary coordinate system, respectively.

A voltage vector at the time $t'''_p$ is defined as follows:

$$\vec{V}''' = V \cdot e^{j\theta'''_V}, \quad (62)$$

$$\begin{bmatrix} v'''_\alpha \\ v'''_\beta \end{bmatrix} = \begin{bmatrix} V\cos\theta'''_V \\ V\sin\theta'''_V \end{bmatrix}, \quad (63)$$

where $\vec{V}'''$ represents the voltage vector at the time $t'''_p$, $\theta'''_V$ represents an angle of the voltage vector at the time $t'''_p$, and $v'''_\alpha, v'''_\beta$ represent voltages at the random time in the two-phase stationary coordinate system, respectively.

It should be noted that a difference between the angle $\theta_I$ of the current vector at the time $t_p$ and the angle $\theta'_I$ of the current vector at the time $t'_p$ is $\omega_e t_{\Delta 1}$, i.e., $\theta'_I = \theta_I + \omega_e t_{\Delta 1}$, a difference between the angle $\theta_V$ of the voltage vector at the time $t_p$ and the angle $\theta'_V$ of the voltage vector at the time $t'_p$ is $\omega_e t_{\Delta 1}$, i.e., $\theta'_V = \theta_V + \omega_e t_{\Delta 1}$, a difference between the angle $\theta'_I$ of the current vector at the time $t'_p$ and the angle $\theta''_I$ of the current vector at the time $t''_p$ is $\omega_e t_{\Delta 2}$, $\theta''_I = \theta'_I + \omega_e t_{\Delta 2}$, a difference between the angle $\theta'_V$ of the voltage vector at the time $t'_p$ and the angle $\theta''_V$ of the voltage vector at the time $t''_p$ is $\omega_e t_{\Delta 2}$, i.e., $\theta''_V = \theta'_V + \omega_e t_{\Delta 2}$, a difference between the angle $\theta''_I$ of the current vector at the time $t''_p$ and the angle $\theta'''_I$ of the current vector at the time $t'''_p$ is $\omega_e t_{\Delta 3}$, i.e., $\theta'''_I = \theta''_I + \omega_e t_{\Delta 3}$, and a difference between the angle $\theta''_V$ of the voltage vector at the time $t''_p$ and the angle $\theta'''_V$ of the voltage vector at the time $t'''_p$ is $\omega_e t_{\Delta 3}$, i.e., $\theta'''_V = \theta''_V + \omega_e t_{\Delta 3}$, where $\omega_e$ represents an electrical angular frequency.

Therefore, the voltage vector $\vec{V}'''$ at the time $t'''_p$ may be calculated according to the following formulas:

$$\vec{V}''' = V \cdot e^{j\theta'''_I} = V \cdot e^{j(\theta''_V + \omega_e t_{\Delta 3})} = V \cdot e^{j(\theta'_V + \omega_e t_{\Delta 2} + \omega_e t_{\Delta 3})} \quad (64)$$
$$= V \cdot e^{j(\theta_V + \omega_e t_{\Delta 1} + \omega_e t_{\Delta 2} + \omega_e t_{\Delta 3})} = \vec{V} \cdot e^{j\omega_e(t_{\Delta 1} + t_{\Delta 2} + t_{\Delta 3})},$$

$$\vec{V} = \begin{bmatrix} v_\alpha \\ v_\beta \end{bmatrix}. \quad (65)$$

By processing the formulas (64) and (65), the voltage vector $\vec{V}'''$ at the time $t'''_p$ may be calculated $t'''_p$ is acquired as:

$$\vec{V}''' = \quad (66)$$
$$\begin{bmatrix} v'''_\alpha \\ v'''_\beta \end{bmatrix} = \begin{bmatrix} v_\alpha \cos(\omega_e(t_{\Delta 1} + t_{\Delta 2} + t_{\Delta 3})) - v_\beta \sin(\omega_e(t_{\Delta 1} + t_{\Delta 2} + t_{\Delta 3})) \\ v_\beta \cos(\omega_e(t_{\Delta 1} + t_{\Delta 2} + t_{\Delta 3})) + v_\alpha \sin(\omega_e(t_{\Delta 1} + t_{\Delta 2} + t_{\Delta 3})) \end{bmatrix}.$$

When $v_\alpha, v_\beta$ are known, i.e., the command voltage or the sampled voltage is acquired, the voltage vector $\vec{V}'''$ at the time $t'''_p$ can be calculated.

Further, it is known from the manner (1) that when the two sampled currents correspond to the c-phase current and the a-phase current, the current vector $\vec{I}''$ at the time $t''_p$ can be calculated as:

$$\vec{I}'' = \begin{bmatrix} i''_\alpha \\ i''_\beta \end{bmatrix} = \begin{bmatrix} i''_a \\ \dfrac{i'_c - i''_a \cos(\omega_e t_{\Delta 2} - 2\pi/3)}{\sin(\omega_e t_{\Delta 2} - 2\pi/3)} \end{bmatrix}. \quad (67)$$

The current vector $\vec{I}'''$ at the time $t'''_p$ can be calculated according to the current vector $\vec{I}''$ at the time $t''_p$ with the following formula:

$$\vec{I}''' = I \cdot e^{j\theta'''_I} = I \cdot e^{j(\theta''_I + \omega_e t_{\Delta 3})} = \vec{I}'' \cdot e^{j\omega_e t_{\Delta 3}} \quad (68)$$

$$= \begin{bmatrix} i'''_\alpha \\ i'''_\beta \end{bmatrix} = \begin{bmatrix} i''_a \cos(\omega_e t_{\Delta 3}) - \dfrac{i'_c - i''_a \cos(\omega_e t_{\Delta 2} - 2\pi/3)}{\sin(\omega_e t_{\Delta 2} - 2\pi/3)} \cdot \sin(\omega_e t_{\Delta 3}) \\ \dfrac{i'_c - i''_a \cos(\omega_e t_{\Delta 2} - 2\pi/3)}{\sin(\omega_e t_{\Delta 2} - 2\pi/3)} \cdot \cos(\omega_e t_{\Delta 3}) + i''_a \sin(\omega_e t_{\Delta 3}) \end{bmatrix}.$$

When $i''_a, i'_c$ are known, i.e., the c-phase current and the a-phase current are acquired by the sampling, the current vector $\vec{I}'''$ at the time $t'''_p$ can be calculated.

Therefore, after the synchronous conversion is performed on the two sampled currents (the c-phase current and the a-phase current) and the command voltage or the sampled voltage, the voltage vector $\vec{V}'''$ and the current vector $\vec{I}'''$ at the time $t'''_p$, i.e., the voltage vector $\vec{V}'''$ and the current vector $\vec{I}'''$ at the random time of each PWM cycle, can be acquired, so as to allow the current vector and the voltage vector input to the flux observer to be at the same time, thus improving the accuracy of the angle output by the flux observer and allowing the motor to run normally.

In another embodiment of the present disclosure, the two sampled currents may also correspond to the c-phase current and the b-phase current, and by similar processes, the voltage vector $\vec{V}'''$ at the time $t'''_p$ may be acquired as:

$$\vec{V}''' = \begin{bmatrix} v'''_\alpha \\ v'''_\beta \end{bmatrix} = \quad (69)$$
$$\begin{bmatrix} v_\alpha \cos(\omega_e(t_{\Delta 1} + t_{\Delta 2} + t_{\Delta 3})) - v_\beta \sin(\omega_e(t_{\Delta 1} + t_{\Delta 2} + t_{\Delta 3})) \\ v_\beta \cos(\omega_e(t_{\Delta 1} + t_{\Delta 2} + t_{\Delta 3})) + v_\alpha \sin(\omega_e(t_{\Delta 1} + t_{\Delta 2} + t_{\Delta 3})) \end{bmatrix},$$

and the current vector $\vec{I}'''$ at the time $t'''_p$ may be acquired as:

$$\vec{I}''' = \begin{bmatrix} i'''_\alpha \\ i'''_\beta \end{bmatrix} = \begin{bmatrix} \dfrac{i''_b \sin(\omega_e t_{\Delta 2} - 2\pi/3) - i'_c \sin(2\pi/3)}{\sin(\omega_e t_{\Delta 2} - 4\pi/3)} \cos(\omega_e t_{\Delta 3}) - \\ \dfrac{i'_c \cos(2\pi/3) - i''_b \cos(\omega_e t_{\Delta 2} - 2\pi/3)}{\sin(\omega_e t_{\Delta 2} - 4\pi/3)} \sin(\omega_e t_{\Delta 3}) \\ \dfrac{i'_c \cos(2\pi/3) - i''_b \cos(\omega_e t_{\Delta 2} - 2\pi/3)}{\sin(\omega_e t_{\Delta 2} - 4\pi/3)} \cdot \cos(\omega_e t_{\Delta 3}) + \\ \dfrac{i''_b \sin(\omega_e t_{\Delta 2} - 2\pi/3) - i'_c \sin(2\pi/3)}{\sin(\omega_e t_{\Delta 2} - 4\pi/3)} \sin(\omega_e t_{\Delta 3}) \end{bmatrix}. \quad (70)$$

Therefore, after the synchronous conversion is performed on the two sampled currents (the c-phase current and the b-phase current) and the command voltage or the sampled voltage, the voltage vector $\vec{V}'''$ and the current vector $\vec{I}'''$ at the time $t'''_p$, i.e., the voltage vector $\vec{V}'''$ and the current vector $\vec{I}'''$ at the random time of each PWM cycle, can be acquired, so as to allow the current vector and the voltage vector input to the flux observer to be at the same time, thus improving the accuracy of the angle output by the flux observer and allowing the motor to run normally.

The two sampled currents may also correspond to the a-phase current and the b-phase current, and by similar processes, the voltage vector $\vec{V}'''$ at the time $t'''_p$ may be acquired as:

$$\vec{V}''' = \begin{bmatrix} v'''_\alpha \\ v'''_\beta \end{bmatrix} = \begin{bmatrix} v_\alpha \cos(\omega_e(t_{\Delta 1} + t_{\Delta 2} + t_{\Delta 3})) - v_\beta \sin(\omega_e(t_{\Delta 1} + t_{\Delta 2} + t_{\Delta 3})) \\ v_\beta \cos(\omega_e(t_{\Delta 1} + t_{\Delta 2} + t_{\Delta 3})) + v_\alpha \sin(\omega_e(t_{\Delta 1} + t_{\Delta 2} + t_{\Delta 3})) \end{bmatrix} \quad (71)$$

Moreover, the current vector $\vec{I}'''$ at the time $t'''_p$ may be acquired as:

$$\vec{I}''' = \begin{bmatrix} i'''_\alpha \\ i'''_\beta \end{bmatrix} = \begin{bmatrix} i''_a \cos(\omega_e t_{\Delta 3}) - \frac{i''_b - i''_a \cos(\omega_e t_{\Delta 2} + 2\pi/3)}{\sin(\omega_e t_{\Delta 2} + 2\pi/3)} \cdot \sin(\omega_e t_{\Delta 3}) \\ \frac{i''_b - i''_a \cos(\omega_e t_{\Delta 2} + 2\pi/3)}{\sin(\omega_e t_{\Delta 2} + 2\pi/3)} \cdot \cos(\omega_e t_{\Delta 3}) + i''_a \sin(\omega_e t_{\Delta 3}) \end{bmatrix} \quad (72)$$

Therefore, after the synchronous conversion is performed on the two sampled currents (the a-phase current and the b-phase current) and the command voltage or the sampled voltage, the voltage vector $\vec{V}'''$ and the current vector $\vec{I}'''$ at the time $t'''_p$, i.e., the voltage vector $\vec{V}'''$ and the current vector $\vec{I}'''$ at the random time of each PWM cycle, can be acquired, so as to allow the current vector and the voltage vector input to the flux observer to be at the same time, thus improving the accuracy of the angle output by the flux observer and allowing the motor to run normally.

With such a method for synchronously calculating a reconstructed phase current and a phase voltage for a motor driver according to the embodiments of the present disclosure, the DC bus current is sampled and the phase current reconstruction is performed according to the DC bus current to acquire the three-phase current of the motor. During the phase current reconstruction, two sampled currents are acquired for each PWM cycle as the two-phase current of the motor and the command voltage or the sampled voltage is acquired. The synchronous conversion is performed on the two sampled currents and the command voltage or the sampled voltage to allow the current vector and the voltage vector, that are input to the flux observer, to keep synchronous. Therefore, the method may make the current vector and the voltage vector input to the flux observer at the same time, so as to improve the accuracy of the angle output by the flux observer and allow the motor to run normally. Moreover, this calculation method has a small calculation amount and is easy to be realized.

Corresponding to the above embodiments, the present disclosure further provides a non-transitory computer-readable storage medium.

The non-transitory computer-readable storage medium according to the embodiments of the present disclosure has stored therein computer programs that, when executed by a processor, cause the processor to perform a method for synchronously calculating a reconstructed phase current and a phase voltage for a motor driver provided in the above embodiments of the present disclosure.

With the non-transitory computer-readable storage medium according to the embodiments of the present disclosure, the computer programs stored therein can be executed, so as to improve the accuracy of the angle output by the flux observer and allow the motor to run normally.

Corresponding to the above embodiments, the present disclosure further provides a device for synchronously calculating a reconstructed phase current and a phase voltage for a motor driver.

Figure 6:
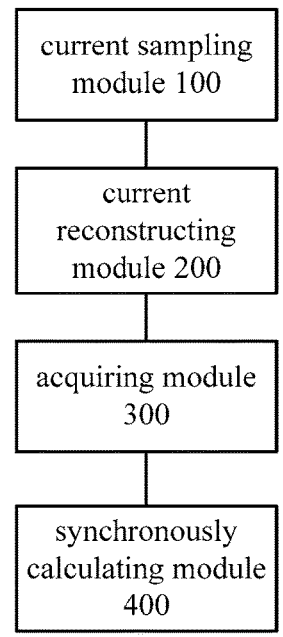
FIG. 6 is a block diagram of a device for synchronously calculating a reconstructed phase current and a phase voltage for a motor driver according to an embodiment of the present disclosure.

As shown in FIG. 6, the device for synchronously calculating a reconstructed phase current and a phase voltage for a motor driver may include a current sampling module 100, a current reconstructing module 200, an acquiring module 300 and a synchronously calculating module 400.

The current sampling module 100 is configured to sample a DC bus current. The current reconstructing module 200 is configured to perform phase current reconstruction according to the DC bus current to acquire a three-phase current of a motor. The acquiring module 300 is configured to acquire two sampled currents of each PWM cycle as a two-phase current of the motor and acquire a command voltage or a sampled voltage during the phase current reconstruction. The synchronously calculating module 400 is configured to perform synchronous conversion on the two sampled currents and the command voltage or the sampled voltage to allow a current vector and a voltage vector, that are input to a flux observer, to keep synchronous.

Specifically, FIG. 2 is a schematic diagram of sampling a DC bus current with a single measuring element and acquiring a three-phase current of a motor according to an embodiment of the present disclosure.

In a specific embodiment of the present disclosure, as shown in FIG. 2, in three-phase bridge arms of a, b and c-phases, the a-phase bridge arm may include an upper bridge switch tube T1 and a lower bridge switch tube T2, the b-phase bridge arm may include an upper bridge switch tube T3 and a lower bridge switch tube T4, and the c-phase bridge arm may include an upper bridge switch T5 and a lower bridge switch T6. When the motor is driven by the SVPWM technology, the upper bridge switch tube and lower bridge switch tube of the bridge arm of each phase are different in state. Moreover, for each phase, when the upper bridge switch tube of the bridge arm is on and the lower bridge switch tube of the bridge is off, it refers to "1"; when the upper bridge switch tube of the bridge arm is off and the lower bridge switch tube of the bridge arm is on, it refers to "0", and thus, in this way, six non-zero vectors "001", "010", "011", "100", "101", "110" and two zero vectors "000", "111" can be formed. As shown in FIG. 3, in one SVPWM cycle, there may be two non-zero vectors "100" and "110". At a time corresponding to the vector "100", i.e., when the upper bridge switch T1 is on and the lower bridge switch T2 is off, the upper bridge switch T3 is off and the lower bridge switch T4 is on, and the upper bridge switch T5 is off and the lower bridge switch T6 is on, the sampled DC bus current is the a-phase current, i.e., $i_a = i_{dc1}$, where $i_{dc1}$ represents the DC bus current sampled at this time, and is represents the a-phase current. At a time corresponding to the vector "110", i.e., when the upper bridge switch T1 is on and the lower bridge switch T2 is off, the upper bridge switch T3 is on and the lower bridge switch T4 is off, and the upper bridge switch T5 is off and the lower bridge switch T6 is on, the sampled DC bus current is the c-phase current, i.e., $i_c = i_{dc2}$, where $i_{dc2}$ represents the DC bus current sampled at this time, and $i_c$ represents the c-phase current. At this time, according to relationship of the three-phase currents, the b-phase current can be calculated by the current reconstructing module 200, and thus the three-phase current of the motor in one PWM cycle can be acquired.

Similarly, the a-phase current and the b-phase current can be acquired by the current reconstructing module 200 according to the states of the switch tubes and the DC bus currents sampled by the current sampling module 100, and the c-phase current can be calculated according to the relationship of the three-phase current, thus acquiring the three-phase current of the motor in one PWM cycle. Alternatively, the b-phase current and the c-phase current can be acquired by the current reconstructing module 200 according to the states of the switch tubes and the DC bus currents sampled by the current sampling module 100, and the a-phase current can be calculated according to the relationship of the three-phase current, thus acquiring the three-phase current of the motor in one PWM cycle.

In an embodiment of the present disclosure, the synchronously calculating module 400 may be used to perform the synchronous conversion on the two sampled currents and the command voltage or the sampled voltage in a manner (1), i.e., by simultaneously converting the two sampled currents into two currents at a time corresponding to the command voltage or the sampled voltage.

In a specific embodiment of the present disclosure, the two sampled currents correspond to the c-phase current and the a-phase current. As shown in FIG. 4, $t_3$–$t_2$ represents a cycle of the PWM carrier wave ($t_3$,$t_2$, respectively, corresponds to a valley of the PWM carrier wave), a time $t_p$ represents a time corresponding to the command voltage or the sampled voltage ($t_p$ is a midpoint between $t'_2$ and $t_3$, i.e., corresponds to a peak of the PWM carrier wave), a time $t'_p$ represents a time corresponding to the c-phase current, a time $t''_p$ represents a time corresponding to the a-phase current, $t_{\Delta 1}$ represents a time difference between the time corresponding to the command voltage or the sampled voltage and the time corresponding to the c-phase current, and $t_{\Delta 2}$ represents a time difference between the time corresponding to the c-phase current and the time corresponding to the a-phase current.

A current vector at the time $t_p$ is defined as follows:

$$\vec{I} = I \cdot e^{j\theta_I}, \quad (1)$$

$$\begin{bmatrix} i_\alpha \\ i_\beta \end{bmatrix} = \begin{bmatrix} I\cos\theta_I \\ I\sin\theta_I \end{bmatrix}, \quad (2)$$

where $\vec{I}$ represents the current vector at the time $t_p$, $I$ represents an amplitude of the current vector $\vec{I}$, $\theta_I$ represents an angle of the current vector at the time $t_p$, and $i_\alpha$, $i_\beta$ represent currents in a two-phase stationary coordinate system, respectively.

A current vector at the time $t'_p$ is defined as follows:

$$\vec{I}' = I \cdot e^{j\theta'_I}, \quad (3)$$

$$\begin{bmatrix} i'_\alpha \\ i'_\beta \end{bmatrix} = \begin{bmatrix} I\cos\theta'_I \\ I\sin\theta'_I \end{bmatrix}, \quad (4)$$

where $\vec{I}'$ represents the current vector at the time $t'_p$, $\theta'_I$ represents an angle of the current vector at the time $t'_p$, and $i'_\alpha$, $i'_\beta$ represent currents at the time corresponding to the c-phase current in the two-phase stationary coordinate system, respectively.

A current vector at the time $t''_p$ is defined as follows:

$$\vec{I}'' = I \cdot e^{j\theta''_I}, \quad (5)$$

$$\begin{bmatrix} i''_\alpha \\ i''_\beta \end{bmatrix} = \begin{bmatrix} I\cos\theta''_I \\ I\sin\theta''_I \end{bmatrix}, \quad (6)$$

where $\vec{I}''$ represents the current vector at the time $t''_p$, $\theta''_I$ represents an angle of the current vector at the time $t''_p$, and $i''_\alpha$, $i''_\beta$ represent currents at the time corresponding to the a-phase current in the two-phase stationary coordinate system, respectively.

It should be noted that a difference between the angle $\theta_I$ of the current vector at the time $t_p$ and the angle $\theta'_I$ of the current vector at the time $t'_p$ is $\omega_e t_{\Delta 1}$, i.e., $\theta'_I = \theta_I + \omega_e t_{\Delta 1}$, and a difference between the angle $\theta'_I$ of the current vector at the time $t'_p$ and the angle $\theta''_I$ of the current vector at the time $t''_p$ is $\omega_e t_{\Delta 2}$, i.e., $\theta''_I = \theta'_I + \omega_e t_{\Delta 2}$, where $\omega_e$ represents an electrical angular frequency.

Therefore, the c-phase current and the a-phase current can be expressed by the synchronously calculating module 400 with the following formulas:

$$i''_a = i''_\alpha, \quad (7\text{-}1)$$

$$\begin{aligned} i'_c &= I\cos(\theta'_I + 2\pi/3) \\ &= I\cos(\theta''_I - \omega_e t_{\Delta 2} + 2\pi/3) \\ &= I\cos\theta''_I \cdot \cos(\omega_e t_{\Delta 2} - 2\pi/3) + I\sin\theta''_I \cdot \sin(\omega_e t_{\Delta 2} - 2\pi/3) \\ &= i''_\alpha \cdot \cos(\omega_e t_{\Delta 2} - 2\pi/3) + i''_\beta \cdot \sin(\omega_e t_{\Delta 2} - 2\pi/3), \end{aligned} \quad (7\text{-}2)$$

where $t_{\Delta 2}$ represents the time difference between the time corresponding to the c-phase current and the time corresponding to the a-phase current, $\omega_e$ represents the electrical angular frequency, and $i''_a$, $i'_c$ represent the a-phase current and the c-phase current, respectively.

The formulas (7-1) and (7-2) are processed by the synchronously calculating module 400 to calculate the current vector $\vec{I}''$ at the time $t''_p$ as follows:

$$\vec{I}'' = \begin{bmatrix} i''_\alpha \\ i''_\beta \end{bmatrix} = \begin{bmatrix} i''_a \\ \dfrac{i'_c - i''_a \cos(\omega_e t_{\Delta 2} - 2\pi/3)}{\sin(\omega_e t_{\Delta 2} - 2\pi/3)} \end{bmatrix}. \quad (8)$$

According to the formulas (1), (3) and (5), it can be acquired that $\vec{I}\,''=I\cdot e^{j\theta''_I}=I\cdot e^{j(\theta'_I+\omega_e t_{\Delta 2})}=I\cdot e^{j(\theta_I+\omega_e t_{\Delta 1}+\omega_e t_{\Delta 2})}=\vec{I}\cdot e^{j\omega_e(t_{\Delta 1}+t_{\Delta 2})}$, that is, it can be acquired that $\vec{I}=\vec{I}\,''\cdot e^{-j\omega_e(t_{\Delta 1}+t_{\Delta 2})}$. In combination with the formula (8), it can be acquired that $$\vec{I}=\begin{bmatrix} i_\alpha \\ i_\beta \end{bmatrix}= \tag{9}$$

$$\begin{bmatrix} i''_a\cdot\cos(\omega_e(t_{\Delta 1}+t_{\Delta 2}))+\dfrac{i'_c-i''_a\cos(\omega_e t_{\Delta 2}-2\pi/3)}{\sin(\omega_e t_{\Delta 2}-2\pi/3)}\cdot\sin(\omega_e(t_{\Delta 1}+t_{\Delta 2})) \\ \dfrac{i'_c-i''_a\cos(\omega_e t_{\Delta 2}-2\pi/3)}{\sin(\omega_e t_{\Delta 2}-2\pi/3)}\cdot\cos(\omega_e(t_{\Delta 1}+t_{\Delta 2}))-i''_a\cdot\sin(\omega_e(t_{\Delta 1}+t_{\Delta 2})) \end{bmatrix}.$$

Therefore, when $i''_a, i'_c$ are known, that is, the c-phase current and the a-phase current are acquired by the acquiring module, the current vector at the time $t_p$ can be calculated by the synchronously calculating module 400, that is, the current vector at the time corresponding to the command voltage or the sampled voltage is acquired, to allow the current vector and the voltage vector input to the flux observer to be at the same time, thus improving the accuracy of the angle output by the flux observer and allowing the motor to run normally.

In another embodiment of the present disclosure, the two sampled currents may also correspond to the c-phase current and the b-phase current, and the synchronously calculating module 400 may perform similar processes to acquire that $$i'_c=I\cos(\theta'_I+2\pi/3) \tag{10-1}$$
$$=I\cos(\theta_I+\omega_e t_{\Delta 1}+2\pi/3)$$
$$=I\cos\theta_I\cos(\omega_e t_{\Delta 1}+2\pi/3)-I\sin\theta_I\sin(\omega_e t_{\Delta 1}+2\pi/3)$$
$$=i_\alpha\cos(\omega_e t_{\Delta 1}+2\pi/3)-i_\beta\sin(\omega_e t_{\Delta 1}+2\pi/3),$$

$$i''_b=I\cos(\theta''_I-2\pi/3) \tag{10-2}$$
$$=I\cos(\theta_I+\omega_e t_{\Delta 1}+\omega_e t_{\Delta 2}-2\pi/3)$$
$$=I\cos\theta_I\cos(\omega_e t_{\Delta 1}+\omega_e t_{\Delta 2}-2\pi/3)-$$
$$I\sin\theta_I\sin(\omega_e t_{\Delta 1}+\omega_e t_{\Delta 2}-2\pi/3)$$
$$=i_\alpha\cos(\omega_e t_{\Delta 1}+\omega_e t_{\Delta 2}-2\pi/3)-$$
$$i_\beta\sin(\omega_e t_{\Delta 1}+\omega_e t_{\Delta 2}-2\pi/3),$$

where $i'_c, i''_b$ represent the c-phase current and the b-phase current, respectively, $\theta_I$ represents an angle of the current vector at the time corresponding to the command voltage or sampled voltage, $\theta'_I$ represents an angle of the current vector at the time corresponding to the c-phase current, $\theta''_I$ represents an angle of the current vector at the time corresponding to the b-phase current, an angle difference between $\theta_I$ and $\theta'_I$ is $\omega_e t_{\Delta 1}$, i.e., $\theta'_I=\theta_I+\omega_e t_{\Delta 1}$, an angle difference between $\theta'_I$ and $\theta''_I$ is $\omega_e t_{\Delta 2}$, i.e., $\theta''_I=\theta'_I+\omega_e t_{\Delta 2}$, $\omega_e$ represents the electrical angular frequency, and $i_\alpha, i_\beta$ represent currents in the two-phase stationary coordinate system, respectively.

By processing the formulas (10-1) and (10-2), it can be acquired that $$i_\beta=\dfrac{i_\alpha\cos(\omega_e t_{\Delta 1}+2\pi/3)-i'_c}{\sin(\omega_e t_{\Delta 1}+2\pi/3)}=\dfrac{i_\alpha\cos(\omega_e t_{\Delta 1}+\omega_e t_{\Delta 2}-2\pi/3)-i''_b}{\sin(\omega_e t_{\Delta 1}+\omega_e t_{\Delta 2}-2\pi/3)}. \tag{11}$$

Moreover, by processing the formula (11), it can be acquired that $$i_\alpha\sin(\omega_e t_{\Delta 1}+\omega_e t_{\Delta 2}-2\pi/3)\cos(\omega_e t_{\Delta 1}+2\pi/3)- \tag{12}$$
$$i'_c\sin(\omega_e t_{\Delta 1}+\omega_e t_{\Delta 2}-2\pi/3)=$$
$$i_\alpha\cos(\omega_e t_{\Delta 1}+\omega_e t_{\Delta 2}-2\pi/3)\sin(\omega_e t_{\Delta 1}+2\pi/3)-$$
$$i''_b\sin(\omega_e t_{\Delta 1}+2\pi/3) \Leftrightarrow i_\alpha=$$
$$\dfrac{i'_c\sin(\omega_e t_{\Delta 1}+\omega_e t_{\Delta 2}-2\pi/3)-i''_b\sin(\omega_e t_{\Delta 1}+2\pi/3)}{\sin(\omega_e t_{\Delta 2}-4\pi/3)}.$$

In addition, by processing the formulas (10-1) and (10-2), it can be further acquired that $$i_\alpha=\dfrac{i'_c+i_\beta\sin(\omega_e t_{\Delta 1}+2\pi/3)}{\cos(\omega_e t_{\Delta 1}+2\pi/3)}=\dfrac{i''_b+i_\beta\sin(\omega_e t_{\Delta 1}+\omega_e t_{\Delta 2}-2\pi/3)}{\cos(\omega_e t_{\Delta 1}+\omega_e t_{\Delta 2}-2\pi/3)}. \tag{13}$$

Further, by processing the formula (13), it can be acquired that $$i'_c\cos(\omega_e t_{\Delta 1}+\omega_e t_{\Delta 2}-2\pi/3)+ \tag{14}$$
$$i_\beta\sin(\omega_e t_{\Delta 1}+2\pi/3)\cos(\omega_e t_{\Delta 1}+\omega_e t_{\Delta 2}-2\pi/3)=$$
$$i''_b\cos(\omega_e t_{\Delta 1}+2\pi/3)+$$
$$i_\beta\cos(\omega_e t_{\Delta 1}+2\pi/3)\sin(\omega_e t_{\Delta 1}+\omega_e t_{\Delta 2}-2\pi/3) \Leftrightarrow$$
$$i_\beta=\dfrac{i'_c\cos(\omega_e t_{\Delta 1}+\omega_e t_{\Delta 2}-2\pi/3)-i''_b\cos(\omega_e t_{\Delta 1}+2\pi/3)}{\sin(\omega_e t_{\Delta 2}-4\pi/3)}.$$

The following formula can be acquired according to the formulas (12) and (14):

$$\vec{I}=\begin{bmatrix} i_\alpha \\ i_\beta \end{bmatrix}=\begin{bmatrix} \dfrac{i'_c\sin(\omega_e t_{\Delta 1}+\omega_e t_{\Delta 2}-2\pi/3)-i''_b\sin(\omega_e t_{\Delta 1}+2\pi/3)}{\sin(\omega_e t_{\Delta 2}-4\pi/3)} \\ \dfrac{i'_c\cos(\omega_e t_{\Delta 1}+\omega_e t_{\Delta 2}-2\pi/3)-i''_b\cos(\omega_e t_{\Delta 1}+2\pi/3)}{\sin(\omega_e t_{\Delta 2}-4\pi/3)} \end{bmatrix}. \tag{15}$$

Therefore, when $i'_c, i''_b$ are known, that is, the c-phase current and the b-phase current are acquired by the acquiring module, the current vector at the time corresponding to the command voltage or the sampled voltage can be calculated by the synchronously calculating module 400, so as to allow the current vector and the voltage vector input to the flux observer to be at the same time, thus improving the accuracy of the angle output by the flux observer and allowing the motor to run normally.

The two sampled currents may also correspond to the a-phase current and the b-phase current, and the synchronously calculating module 400 may perform similar processes to acquire that $$i'_b=I\cos(\theta'_I-2\pi/3) \tag{16-1}$$
$$=I\cos(\theta_I+\omega_e t_{\Delta 1}-2\pi/3)$$
$$=I\cos\theta_I\cos(\omega_e t_{\Delta 1}-2\pi/3)-I\sin\theta_I\sin(\omega_e t_{\Delta 1}-2\pi/3)$$
$$=i_\alpha\cos(\omega_e t_{\Delta 1}-2\pi/3)-i_\beta\sin(\omega_e t_{\Delta 1}-2\pi/3),$$

-continued $$i''_a = I\cos\theta''_I \quad (16\text{-}2)$$
$$= I\cos(\theta_I + \omega_e t_{\Delta 1} + \omega_e t_{\Delta 2})$$
$$= I\cos\theta_I \cos(\omega_e t_{\Delta 1} + \omega_e t_{\Delta 2}) - I\sin\theta_I \sin(\omega_e t_{\Delta 1} + \omega_e t_{\Delta 2})$$
$$= i_\alpha \cos(\omega_e t_{\Delta 1} + \omega_e t_{\Delta 2}) - i_\beta \sin(\omega_e t_{\Delta 1} + \omega_e t_{\Delta 2}),$$

where $i''_a, i'_b$ represent the a-phase current and the b-phase current, respectively, $\theta_I$ represents the angle of the current vector at the time corresponding to the command voltage or sampled voltage, $\theta'_I$ represents an angle of the current vector at the time corresponding to the b-phase current, $\theta''_I$ represents an angle of the current vector at the time corresponding to the a-phase current, an angle difference between $\theta_I$ and $\theta'_I$ is $\omega_e t_{\Delta 1}$, i.e., $\theta'_I = \theta_I + \omega_e t_{\Delta 1}$, an angle difference between $\theta'_I$ and $\theta''_I$ is $\omega_e t_{\Delta 2}$, i.e., $\theta''_I = \theta'_I + \omega_e t_{\Delta 2}$, $\omega_e$ represents the electrical angular frequency, and $i_\alpha, i_\beta$ represent currents in the two-phase stationary coordinate system, respectively.

By processing the formulas (16-1) and (16-2), it can be acquired that $$i_\beta = \frac{i_\alpha \cos(\omega_e t_{\Delta 1} - 2\pi/3) - i'_b}{\sin(\omega_e t_{\Delta 1} - 2\pi/3)} = \frac{i_\alpha \cos(\omega_e t_{\Delta 1} + \omega_e t_{\Delta 2}) - i''_a}{\sin(\omega_e t_{\Delta 1} + \omega_e t_{\Delta 2})}. \quad (17)$$

Moreover, by processing the formula (17), it can be acquired that $$i_\alpha \sin(\omega_e t_{\Delta 1} - 2\pi/3)\cos(\omega_e t_{\Delta 1} + \omega_e t_{\Delta 2}) - i''_a \sin(\omega_e t_{\Delta 1} - 2\pi/3) = \quad (18)$$
$$i_\alpha \cos(\omega_e t_{\Delta 1} - 2\pi/3)\sin(\omega_e t_{\Delta 1} + \omega_e t_{\Delta 2}) - i'_b \sin(\omega_e t_{\Delta 1} + \omega_e t_{\Delta 2}) \Leftrightarrow$$
$$i_\alpha = \frac{i'_b \sin(\omega_e t_{\Delta 1} + \omega_e t_{\Delta 2}) - i''_a \sin(\omega_e t_{\Delta 1} - 2\pi/3)}{\sin(\omega_e t_{\Delta 2} + 2\pi/3)}.$$

In addition, by processing the formulas (16-1) and (16-2), it can be further acquired that $$i_\alpha = \frac{i'_b + i_\beta \sin(\omega_e t_{\Delta 1} - 2\pi/3)}{\cos(\omega_e t_{\Delta 1} - 2\pi/3)} = \frac{i''_a + i_\beta \sin(\omega_e t_{\Delta 1} + \omega_e t_{\Delta 2})}{\cos(\omega_e t_{\Delta 1} + \omega_e t_{\Delta 2})}. \quad (19)$$

Further, by processing the formula (19), it can be acquired that $$i'_b \cos(\omega_e t_{\Delta 1} + \omega_e t_{\Delta 2}) + i_\beta \sin(\omega_e t_{\Delta 1} - 2\pi/3)\cos(\omega_e t_{\Delta 1} + \omega_e t_{\Delta 2}) = \quad (20)$$
$$i''_a \cos(\omega_e t_{\Delta 1} - 2\pi/3) + i_\beta \cos(\omega_e t_{\Delta 1} - 2\pi/3)\sin(\omega_e t_{\Delta 1} + \omega_e t_{\Delta 2}) \Leftrightarrow i_\beta =$$
$$\frac{i'_b \cos(\omega_e t_{\Delta 1} + \omega_e t_{\Delta 2}) - i''_a \cos(\omega_e t_{\Delta 1} - 2\pi/3)}{\sin(\omega_e t_{\Delta 2} + 2\pi/3)}.$$

The following formula can be acquired according to the formulas (18) and (20):

$$\vec{I} = \begin{bmatrix} i_\alpha \\ i_\beta \end{bmatrix} = \begin{bmatrix} \frac{i'_b \sin(\omega_e t_{\Delta 1} + \omega_e t_{\Delta 2}) - i''_a \sin(\omega_e t_{\Delta 1} - 2\pi/3)}{\sin(\omega_e t_{\Delta 2} + 2\pi/3)} \\ \frac{i'_b \cos(\omega_e t_{\Delta 1} + \omega_e t_{\Delta 2}) - i''_a \cos(\omega_e t_{\Delta 1} - 2\pi/3)}{\sin(\omega_e t_{\Delta 2} + 2\pi/3)} \end{bmatrix}. \quad (21)$$

Therefore, when $i''_a, i'_b$ are known, that is, the a-phase current and the b-phase current are acquired by the acquiring module 300, the current vector at the time corresponding to the command voltage or the sampled voltage can be calculated by the synchronously calculating module 400 so as to allow the current vector and the voltage vector input to the flux observer to be at the same time, thus improving the accuracy of the angle output by the flux observer and allowing the motor to run normally.

In an embodiment of the present disclosure, the synchronously calculating module 400 may be used to perform the synchronous conversion on the two sampled currents and the command voltage or the sampled voltage in manner (2), i.e., by simultaneously converting one of the two sampled currents and the command voltage or the sampled voltage into a current and a voltage at a time corresponding to the other one of the two sampled currents.

In a specific embodiment of the present disclosure, the two sampled currents correspond to the c-phase current and the a-phase current. As shown in FIG. 4, $t_3$–$t_2$ represents a cycle of the PWM carrier wave ($t_3, t_2$, respectively, corresponds to a valley of the PWM carrier wave), a time $t_p$ represents a time corresponding to the command voltage or the sampled voltage ($t_p$ is a midpoint between $t_2$ and $t_3$, i.e., corresponds to a peak of the PWM carrier wave), a time $t'_p$ represents a time corresponding to the c-phase current, a time $t''_p$ represents a time corresponding to the a-phase current, $t_{\Delta 1}$ represents a time difference between the time corresponding to the command voltage or the sampled voltage and the time corresponding to the c-phase current, and $t_{\Delta 2}$ represents a time difference between the time corresponding to the c-phase current and the time corresponding to the a-phase current.

A current vector at the time $t_p$ is defined as follows:

$$\vec{I} = I \cdot e^{j\theta_I}, \quad (22)$$

$$\begin{bmatrix} i_\alpha \\ i_\beta \end{bmatrix} = \begin{bmatrix} I\cos\theta_I \\ I\sin\theta_I \end{bmatrix}, \quad (23)$$

where $\vec{I}$ represents the current vector at the time $t_p$, I represents an amplitude of the current vector $\vec{I}$, $\theta_I$ represents an angle of the current vector at the time $t_p$, and $i_\alpha, i_\beta$ represent currents in a two-phase stationary coordinate system, respectively.

A voltage vector at the time $t_p$ is defined as follows:

$$\vec{V} = V \cdot e^{j\theta_V}, \quad (24)$$

$$\begin{bmatrix} v_\alpha \\ v_\beta \end{bmatrix} = \begin{bmatrix} V\cos\theta_V \\ V\sin\theta_V \end{bmatrix}, \quad (25)$$

where $\vec{V}$ represents the voltage vector at the time $t_p$, V represents an amplitude of the voltage vector $\vec{V}$, $\theta_V$ represents an angle of the voltage vector at the time $t_p$, and $v_\alpha, v_\beta$ represent voltages in the two-phase stationary coordinate system, respectively.

A current vector at the time $t'_p$ is defined as follows:

$$\vec{I}' = I \cdot e^{j\theta'_I}, \quad (26)$$

-continued $$\begin{bmatrix} i'_\alpha \\ i'_\beta \end{bmatrix} = \begin{bmatrix} I\cos\theta'_I \\ I\sin\theta'_I \end{bmatrix}, \quad (27)$$

where $\vec{I}\,'$ represents the current vector at the time $t'_p$, $\theta'_I$ represents an angle of the current vector at the time $t'_p$, and $i'_\alpha, i'_\beta$ represent currents at the time corresponding to the c-phase current in the two-phase stationary coordinate system, respectively.

A voltage vector at the time $t'_p$ is defined as follows:

$$\vec{V}' = V \cdot e^{j\theta'_V}, \quad (28)$$

$$\begin{bmatrix} v'_\alpha \\ v'_\beta \end{bmatrix} = \begin{bmatrix} V\cos\theta'_V \\ V\sin\theta'_V \end{bmatrix}, \quad (29)$$

where $\vec{V}\,'$ represents the voltage vector at the time $t'_p$, $\theta'_V$ represents an angle of the voltage vector at the time $t'_p$, and $v'_\alpha, v'_\beta$ represent voltages at the time corresponding to the c-phase current in the two-phase stationary coordinate system, respectively.

A current vector at the time $t''_p$ is defined as follows:

$$\vec{I}'' = I \cdot e^{j\theta''_I}, \quad (30)$$

$$\begin{bmatrix} i''_\alpha \\ i''_\beta \end{bmatrix} = \begin{bmatrix} I\cos\theta''_I \\ I\sin\theta''_I \end{bmatrix}, \quad (31)$$

where $\vec{I}\,''$ represents the current vector at the time $t''_p$, $\theta''_I$ represents an angle of the current vector at the time $t''_p$, and $i''_\alpha, i''_\beta$ represent currents at the time corresponding to the a-phase current in the two-phase stationary coordinate system, respectively.

A voltage vector at the time $t''_p$ is defined as follows:

$$\vec{V}'' = V \cdot e^{j\theta''_V}, \quad (32)$$

$$\begin{bmatrix} v''_\alpha \\ v''_\beta \end{bmatrix} = \begin{bmatrix} V\cos\theta''_V \\ V\sin\theta''_V \end{bmatrix}, \quad (33)$$

where $\vec{V}\,''$ represents the voltage vector at the time $t''_p$, $\theta''_V$ represents an angle of the voltage vector at the time $t''_p$, and $v''_\alpha, v''_\beta$ represent voltages at the time corresponding to the a-phase current in the two-phase stationary coordinate system, respectively.

It should be noted that a difference between the angle $\theta_I$ of the current vector at the time $t_p$ and the angle $\theta'_I$ of the current vector at the time $t'_p$ is $\omega_e t_{\Delta 1}$, i.e., $\theta'_I = \theta_I + \omega_e t_{\Delta 1}$, a difference between the angle $\theta_V$ of the voltage vector at the time $t_p$ and the angle $\theta'_V$ pf the voltage vector at the time $t'_p$ is $\omega_e t_{\Delta 1}$, i.e., $\theta'_V = \theta_V + \omega_e t_{\Delta 1}$, a difference between the angle $\theta'_I$ of the current vector at the time $t'_p$ and the angle $\theta''_I$ of the current vector at the time $t''_p$ is $\omega_e t_{\Delta 2}$, i.e., $\theta''_I = \theta'_I + \omega_e t_{\Delta 2}$, and a difference between the angle $\theta'_V$ of the voltage vector at the time $t'_p$ and the angle $\theta''_V$ of the voltage vector at the time $t''_p$ is $\omega_e t_{\Delta 2}$, i.e., $\theta''_V = \theta'_V + \omega_e t_{\Delta 2}$, where $\omega_e$ represents an electrical angular frequency.

Therefore, the voltage vector $\vec{V}\,''$ at the time $t''_p$ may be calculated by the synchronously calculating module 400 according to the voltage vector $\vec{V}$ at the time $t_p$ with the following formulas:

$$\begin{aligned}\vec{V}'' &= V \cdot e^{j\theta''_V} \\ &= V \cdot e^{j(\theta'_V + \omega_e t_{\Delta 2})} \\ &= V \cdot e^{j(\theta_V + \omega_e t_{\Delta 1} + \omega_e t_{\Delta 2})} \\ &= \vec{V} \cdot e^{j\omega_e(t_{\Delta 1} + t_{\Delta 2})},\end{aligned} \quad (34)$$

$$\vec{V} = \begin{bmatrix} v_\alpha \\ v_\beta \end{bmatrix}. \quad (35)$$

By processing the formulas (34) and (35), the voltage vector $\vec{V}\,''$ at the time $t''_p$ is acquired as:

$$\vec{V}'' = \begin{bmatrix} v''_\alpha \\ v''_\beta \end{bmatrix} = \begin{bmatrix} v_\alpha\cos(\omega_e(t_{\Delta 1}+t_{\Delta 2})) - v_\beta\sin(\omega_e(t_{\Delta 1}+t_{\Delta 2})) \\ v_\beta\cos(\omega_e(t_{\Delta 1}+t_{\Delta 2})) + v_\alpha\sin(\omega_e(t_{\Delta 1}+t_{\Delta 2})) \end{bmatrix}. \quad (36)$$

When $v_\alpha, v_\beta$ are known, i.e., the command voltage or the sampled voltage is acquired, the voltage vector $\vec{V}\,''$ at the time $t''_p$ can be calculated by the synchronously calculating module 400.

Further, it is known from the manner (1) that when the two sampled currents correspond to the c-phase current and the a-phase current, the current vector $\vec{I}\,''$ at the time $t''_p$ can be calculated by the synchronously calculating module 400 as:

$$\vec{I}'' = \begin{bmatrix} i''_\alpha \\ i''_\beta \end{bmatrix} = \begin{bmatrix} i''_a \\ \dfrac{i'_c - i''_a\cos(\omega_e t_{\Delta 2} - 2\pi/3)}{\sin(\omega_e t_{\Delta 2} - 2\pi/3)} \end{bmatrix}. \quad (37)$$

When $i''_a, i'_c$ are known, i.e., the c-phase current and the a-phase current are acquired by the sampling, the current vector $\vec{I}\,''$ at the time $t''_p$ can be calculated by the synchronously calculating module 400.

Therefore, after the synchronous conversion is performed by the synchronously calculating module 400 on the two sampled currents (the c-phase current and the a-phase current) and the command voltage or the sampled voltage, the voltage vector $\vec{V}\,''$ and the current vector $\vec{I}\,''$ at the time $t''_p$, i.e., the voltage vector $\vec{V}\,''$ and the current vector $\vec{I}\,''$ at the time corresponding to the a-phase current, can be acquired, so as to allow the current vector and the voltage vector input to the flux observer to be at the same time, thus improving the accuracy of the angle output by the flux observer and allowing the motor to run normally.

In another embodiment of the present disclosure, the two sampled currents may also correspond to the c-phase current and the b-phase current, and the synchronously calculating module 400 performs similar processes to acquire the voltage vector $\vec{V}''$ at the time $t''_p$ as:

$$\vec{V}'' = \begin{bmatrix} v''_\alpha \\ v''_\beta \end{bmatrix} = \begin{bmatrix} v_\alpha \cos(\omega_e(t_{\Delta 1} + t_{\Delta 2})) - v_\beta \sin(\omega_e(t_{\Delta 1} + t_{\Delta 2})) \\ v_\beta \cos(\omega_e(t_{\Delta 1} + t_{\Delta 2})) + v_\alpha \sin(\omega_e(t_{\Delta 1} + t_{\Delta 2})) \end{bmatrix}. \quad (38)$$

Moreover, the following formulas are acquired:

$$\begin{aligned} i'_c &= I\cos(\theta'_l + 2\pi/3) \\ &= I\cos(\theta''_l - \omega_e t_{\Delta 2} + 2\pi/3) \\ &= I\cos\theta''_l \cos(-\omega_e t_{\Delta 2} + 2\pi/3) - I\sin\theta''_l \sin(-\omega_e t_{\Delta 2} + 2\pi/3) \\ &= I\cos\theta''_l \cos(\omega_e t_{\Delta 2} - 2\pi/3) + I\sin\theta''_l \sin(\omega_e t_{\Delta 2} - 2\pi/3) \\ &= i''_\alpha \cos(\omega_e t_{\Delta 2} - 2\pi/3) + i''_\beta \sin(\omega_e t_{\Delta 2} - 2\pi/3), \end{aligned} \quad (39\text{-}1)$$

$$\begin{aligned} i''_b &= I\cos(\theta''_l - 2\pi/3) \\ &= I\cos\theta''_l \cos(2\pi/3) + I\sin\theta''_l \sin(2\pi/3) \\ &= i''_\alpha \cos(2\pi/3) + i''_\beta \sin(2\pi/3). \end{aligned} \quad (39\text{-}2)$$

By processing the formulas (39-1) and (39-2), it can be acquired that $$i''_\beta = \frac{i'_c - i''_\alpha \cos(\omega_e t_{\Delta 2} - 2\pi/3)}{\sin(\omega_e t_{\Delta 2} - 2\pi/3)} = \frac{i''_b - i''_\alpha \cos(2\pi/3)}{\sin(2\pi/3)}. \quad (40)$$

Moreover, by processing the formula (40), it can be acquired that $$i'_c(2\pi/3) - i''_\alpha \cos(\omega_e t_{\Delta 2} - 2\pi/3)\sin(2\pi/3) = \quad (41)$$

$$i''_b \sin(\omega_e t_{\Delta 2} - 2\pi/3) - i''_\alpha \sin(\omega_e t_{\Delta 2} - 2\pi/3)\cos(2\pi/3) \Leftrightarrow i''_\alpha =$$

$$\frac{i''_b \sin(\omega_e t_{\Delta 2} - 2\pi/3) - i'_c \sin(2\pi/3)}{\sin(\omega_e t_{\Delta 2} - 4\pi/3)}.$$

In addition, by processing the formulas (39-1) and (39-2), it can be further acquired that $$i''_\alpha = \frac{i'_c - i''_\beta \sin(\omega_e t_{\Delta 2} - 2\pi/3)}{\cos(\omega_e t_{\Delta 2} - 2\pi/3)} = \frac{i''_b - i''_\beta \sin(2\pi/3)}{\cos(2\pi/3)}. \quad (42)$$

Moreover, by processing the formula (42), it can be acquired that $$i'_c \cos(2\pi/3) - i''_\beta \sin(\omega_e t_{\Delta 2} - 2\pi/3)\cos(2\pi/3) = \quad (43)$$

$$i''_b \cos(\omega_e t_{\Delta 2} - 2\pi/3) - i''_\beta \cos(\omega_e t_{\Delta 2} - 2\pi/3)\sin(2\pi/3) \Leftrightarrow i''_\beta =$$

$$\frac{i'_c \cos(2\pi/3) - i''_b \cos(\omega_e t_{\Delta 2} - 2\pi/3)}{\sin(\omega_e t_{\Delta 2} - 4\pi/3)}.$$

The following formula can be acquired according to the formulas (41) and (43):

$$\vec{I}'' = \begin{bmatrix} i''_\alpha \\ i''_\beta \end{bmatrix} = \begin{bmatrix} \frac{i''_b \sin(\omega_e t_{\Delta 2} - 2\pi/3) - i'_c \sin(2\pi/3)}{\sin(\omega_e t_{\Delta 2} - 4\pi/3)} \\ \frac{i'_c \cos(2\pi/3) - i''_b \cos(\omega_e t_{\Delta 2} - 2\pi/3)}{\sin(\omega_e t_{\Delta 2} - 4\pi/3)} \end{bmatrix}. \quad (44)$$

Therefore, when $i'_c, i''_b$ are known, i.e., the c-phase current and the b-phase current are acquired by the acquiring module 300, the voltage vector $\vec{V}''$ and the current vector $\vec{I}''$ at the time $t''_p$, i.e., the voltage vector $\vec{V}''$ and the current vector $\vec{I}''$ at the time corresponding to the b-phase current, can be acquired by the synchronously calculating module 400, so as to allow the current vector and the voltage vector input to the flux observer to be at the same time, thus improving the accuracy of the angle output by the flux observer and allowing the motor to run normally.

The two sampled currents may also correspond to the a-phase current and the b-phase current, and the synchronously calculating module 400 may perform similar processes to acquire that $$\vec{V}'' = \begin{bmatrix} v''_\alpha \\ v''_\beta \end{bmatrix} = \begin{bmatrix} v_\alpha \cos(\omega_e(t_{\Delta 1} + t_{\Delta 2})) - v_\beta \sin(\omega_e(t_{\Delta 1} + t_{\Delta 2})) \\ v_\beta \cos(\omega_e(t_{\Delta 1} + t_{\Delta 2})) + v_\alpha \sin(\omega_e(t_{\Delta 1} + t_{\Delta 2})) \end{bmatrix}. \quad (45)$$

Moreover, it can be acquired that $$\begin{aligned} i'_b &= I\cos(\theta'_l - 2\pi/3) \\ &= I\cos(\theta''_l - \omega_e t_{\Delta 2} - 2\pi/3) \\ &= I\cos\theta''_l \cos(\omega_e t_{\Delta 2} + 2\pi/3) + I\sin\theta''_l \sin(\omega_e t_{\Delta 2} + 2\pi/3) \\ &= i''_\alpha \cos(\omega_e t_{\Delta 2} + 2\pi/3) + i''_\beta \sin(\omega_e t_{\Delta 2} + 2\pi/3), \end{aligned} \quad (46\text{-}1)$$

$$\begin{aligned} i''_a &= I\cos\theta''_l. \\ &= i''_\alpha \end{aligned} \quad (46\text{-}2)$$

Further, by processing the formulas (46-1) and (46-2), it can be acquired that $$\vec{I}'' = \begin{bmatrix} i''_\alpha \\ i''_\beta \end{bmatrix} = \begin{bmatrix} i''_a \\ \frac{i'_b - i''_a \cos(\omega_e t_{\Delta 2} + 2\pi/3)}{\sin(\omega_e t_{\Delta 2} + 2\pi/3)} \end{bmatrix}. \quad (47)$$

Therefore, when $i''_a, i'_b$ are known, i.e., the a-phase current and the b-phase current are acquired by the acquiring module 300, the voltage vector $\vec{V}''$ and the current vector $\vec{I}''$ at the time $t''_p$, i.e., the voltage vector $\vec{V}''$ and the current vector $\vec{I}''$ at the time corresponding to the a-phase current, can be calculated by the synchronously calculating module 400, so as to allow the current vector and the voltage vector input to the flux observer to be at the same time, thus improving the accuracy of the angle output by the flux observer and allowing the motor to run normally.

In an embodiment of the present disclosure, the synchronously calculating module 400 may perform the synchronous conversion on the two sampled currents and the command voltage or the sampled voltage in a manner (3), i.e., by simultaneously converting the two sampled currents and the command voltage or the sampled voltage into two currents and a voltage at a random time in each PWM cycle.

In a specific embodiment of the present disclosure, the two sampled currents correspond to the c-phase current and the a-phase current. As shown in FIG. 5, $t_3$–$t_2$ represents a cycle of the PWM carrier wave ($t_3$,$t_2$, respectively, corresponds to a valley of the PWM carrier wave), a time $t_p$ represents a time corresponding to the command voltage or the sampled voltage ($t_p$ is a midpoint between $t_2$ and $t_3$, i.e., corresponds to a peak of the PWM carrier wave), a time $t'_p$ represents a time corresponding to the c-phase current, a time $t''_p$ represents a time corresponding to the a-phase current, a time $t'''_p$ represents a random time in a PWM cycle, $t'_{\Delta 1}$ represents a time difference between the time corresponding to the command voltage or the sampled voltage and the time corresponding to the c-phase current, $t_{\Delta 2}$ represents a time difference between the time corresponding to the c-phase current and the time corresponding to the a-phase current, and $t_{\Delta 3}$, represents a time difference between the time corresponding to the a-phase current and the random time.

A current vector at the time $t_p$ is defined as follows:

$$\vec{I} = I \cdot e^{j\theta_I}, \tag{48}$$

$$\begin{bmatrix} i_\alpha \\ i_\beta \end{bmatrix} = \begin{bmatrix} I\cos\theta_I \\ I\sin\theta_I \end{bmatrix}, \tag{49}$$

where $\vec{I}$ represents the current vector at the time $t_p$, $\theta_I$ represents an amplitude of the current vector $\vec{I}$, $\theta_I$ represents an angle of the current vector at the time $t_p$, and $i_\alpha$,$i_\beta$ represent currents in a two-phase stationary coordinate system, respectively.

A voltage vector at the time $t_p$ is defined as follows:

$$\vec{V} = V \cdot e^{j\theta_V}, \tag{50}$$

$$\begin{bmatrix} v_\alpha \\ v_\beta \end{bmatrix} = \begin{bmatrix} V\cos\theta_V \\ V\sin\theta_V \end{bmatrix}, \tag{51}$$

where $\vec{V}$ represents the voltage vector at the time $t_p$, V represents an amplitude of the voltage vector $\vec{V}$, $\theta_V$ represents an angle of the voltage vector at the time $t_p$, and $v_\alpha$,$v_\beta$ represent voltages in the two-phase stationary coordinate system, respectively.

A current vector at the time $t'_p$ is defined as follows:

$$\vec{I}' = I \cdot e^{j\theta'_I}, \tag{52}$$

$$\begin{bmatrix} i'_\alpha \\ i'_\beta \end{bmatrix} = \begin{bmatrix} I\cos\theta'_I \\ I\sin\theta'_I \end{bmatrix}, \tag{53}$$

where $\vec{I}'$ represents the current vector at the time $t'_p$, $\theta'_I$ represents an angle of the current vector at the time $t'_p$, and $i'_\alpha$,$i'_\beta$ represent currents at the time corresponding to the c-phase current in the two-phase stationary coordinate system, respectively.

A voltage vector at the time $t'_p$ is defined as follows:

$$\vec{V}' = V \cdot e^{j\theta'_V}, \tag{54}$$

$$\begin{bmatrix} v'_\alpha \\ v'_\beta \end{bmatrix} = \begin{bmatrix} V\cos\theta'_V \\ V\sin\theta'_V \end{bmatrix}, \tag{55}$$

where $\vec{V}'$ represents the voltage vector at the time $t_p$, $\theta'_V$ represents an angle of the voltage vector at the time $t'_p$, and $v'_\alpha$,$v'_\beta$ represent voltages at the time corresponding to the c-phase current in the two-phase stationary coordinate system, respectively.

A current vector at the time $t''_p$ is defined as follows:

$$\vec{I}'' = I \cdot e^{j\theta''_I}, \tag{56}$$

$$\begin{bmatrix} i''_\alpha \\ i''_\beta \end{bmatrix} = \begin{bmatrix} I\cos\theta''_I \\ I\sin\theta''_I \end{bmatrix}, \tag{57}$$

where $\vec{I}''$ represents the current vector at the time $t''_p$, $\theta''_I$ represents an angle of the current vector at the time $t''_p$, and $i''_\alpha$,$i''_\beta$ represent currents at the time corresponding to the a-phase current in the two-phase stationary coordinate system, respectively.

A voltage vector at the time $t''_p$ is defined as follows:

$$\vec{V}'' = V \cdot e^{j\theta''_V}, \tag{58}$$

$$\begin{bmatrix} v''_\alpha \\ v''_\beta \end{bmatrix} = \begin{bmatrix} V\cos\theta''_V \\ V\sin\theta''_V \end{bmatrix}, \tag{59}$$

where $\vec{V}''$ represents the voltage vector at the time $t''_p$, $\theta''_V$ represents an angle of the voltage vector at the time $t''_p$, and $v''_\alpha$, $v''_\beta$ represent voltages at the time corresponding to the a-phase current in the two-phase stationary coordinate system, respectively.

A current vector at the time $t'''_p$ is defined as follows:

$$\vec{I}''' = I \cdot e^{j\theta'''_I}, \tag{60}$$

$$\begin{bmatrix} i'''_\alpha \\ i'''_\beta \end{bmatrix} = \begin{bmatrix} I\cos\theta'''_I \\ I\sin\theta'''_I \end{bmatrix}, \tag{61}$$

where $\vec{I}'''$ represents the current vector at the time $t'''_p$, $\theta'''_I$ represents an angle of the current vector at the time $t'''_p$, and $i'''_\alpha$,$i'''_\beta$ represent currents at the random time in the two-phase stationary coordinate system, respectively.

A voltage vector at the time $t'''_p$ is defined as follows:

$$\vec{V}''' = V \cdot e^{j\theta'''_V}, \tag{62}$$

$$\begin{bmatrix} v'''_\alpha \\ v'''_\beta \end{bmatrix} = \begin{bmatrix} V\cos\theta'''_V \\ V\sin\theta'''_V \end{bmatrix}, \tag{63}$$

where $\vec{V}'''$ represents the voltage vector at the time $t'''_p$, $\theta'''_V$ represents an angle of the voltage vector at the time $t'''_p$, and $v'''_\alpha, v'''_\beta$ represent voltages at the random time in the two-phase stationary coordinate system, respectively.

It should be noted that a difference between the angle $\theta_I$ of the current vector at the time $t_p$ and the angle $\theta'_I$ of the current vector at the time $t'_p$ is $\omega_e t_{\Delta 1}$, i.e., $\theta'_I = \theta_I + \omega_e t_{\Delta 1}$, a difference between the angle $\theta_V$ of the voltage vector at the time $t_p$ and the angle $\theta'_V$ of the voltage vector at the time $t'_p$ is $\omega_e t_{\Delta 1}$, i.e., $\theta'_V = \theta_V + \omega_e t_{\Delta 1}$, a difference between the angle $\theta'_I$ of the current vector at the time $t'_p$ and the angle $\theta''_I$ of the current vector at the time $t''_p$ is $\omega_e t_{\Delta 2}$, i.e., $\theta''_I = \theta'_I + \omega_e t_{\Delta 2}$, a difference between the angle $\theta'_V$ BV of the voltage vector at the time $t'_p$ and the angle $\theta''_V$ of the voltage vector at the time $t''_p$ is $\omega_e t_{\Delta 2}$, i.e., $\theta''_V = \theta'_V + \omega_e t_{\Delta 2}$, a difference between the angle $\theta''_I$ of the current vector at the time $t''_p$ and the angle $\theta'''_I$ of the current vector at the time $t'''_p$ is $\omega_e t_{\Delta 3}$, i.e., $\theta'''_I = \theta''_I + \omega_e t_{\Delta 3}$, and a difference between the angle $\theta''_V$ of the voltage vector at the time $t''_p$ and the angle $\theta'''_V$ of the voltage vector at the time $t'''_p$ is $\omega_e t_{\Delta 3}$, i.e., $\theta'''_V = \theta''_V + \omega_e t_{\Delta 3}$, where $\omega_e$ represents an electrical angular frequency.

Therefore, the voltage vector $\vec{V}'''$ at the time $t'''_p$ may be calculated by the synchronously calculating module 400 according to the following formulas:

$$\vec{V}''' = V \cdot e^{j\theta'''_I} = V \cdot e^{j(\theta''_V + \omega_e t_{\Delta 3})} \tag{64}$$
$$= V \cdot e^{j(\theta'_V + \omega_e t_{\Delta 2} + \omega_e t_{\Delta 3})}$$
$$= V \cdot e^{j(\theta_V + \omega_e t_{\Delta 1} + \omega_e t_{\Delta 2} + \omega_e t_{\Delta 3})}$$
$$= \vec{V} \cdot e^{j\omega_e(t_{\Delta 1} + t_{\Delta 2} + t_{\Delta 3})},$$

$$\vec{V} = \begin{bmatrix} v_\alpha \\ v_\beta \end{bmatrix}. \tag{65}$$

By processing the formulas (64) and (65), the voltage vector $\vec{V}'''$ at the time $t'''_p$ is acquired as:

$$\vec{V}''' = \begin{bmatrix} v'''_\alpha \\ v'''_\beta \end{bmatrix} = \begin{bmatrix} v_\alpha \cos(\omega_e(t_{\Delta 1} + t_{\Delta 2} + t_{\Delta 3})) - v_\beta \sin(\omega_e(t_{\Delta 1} + t_{\Delta 2} + t_{\Delta 3})) \\ v_\beta \cos(\omega_e(t_{\Delta 1} + t_{\Delta 2} + t_{\Delta 3})) + v_\alpha \sin(\omega_e(t_{\Delta 1} + t_{\Delta 2} + t_{\Delta 3})) \end{bmatrix}. \tag{66}$$

When $v_\alpha, v_\beta$ are known, i.e., the command voltage or the sampled voltage is acquired by the acquiring module 300, the voltage vector $\vec{V}'''$ at the time $t'''_p$ can be calculated by the synchronously calculating module 400.

Further, it is known from the manner (1) that when the two sampled currents correspond to the c-phase current and the a-phase current, the current vector $\vec{I}''$ at the time $t''_p$ can be calculated by the synchronously calculating module 400 as:

$$\vec{I}'' = \begin{bmatrix} i''_\alpha \\ i''_\beta \end{bmatrix} \tag{67}$$
$$= \begin{bmatrix} i''_a \\ \dfrac{i'_c - i''_a \cos(\omega_e t_{\Delta 2} - 2\pi/3)}{\sin(\omega_e t_{\Delta 2} - 2\pi/3)} \end{bmatrix}.$$

The current vector $\vec{I}'''$ at the time $t'''_p$ can be calculated according to the current vector $\vec{I}''$ at the time $t''_p$ with the following formula:

$$\vec{I}''' = I \cdot e^{j\theta'''_I} \tag{68}$$
$$= I \cdot e^{j(\theta''_I + \omega_e t_{\Delta 3})}$$
$$= \vec{I}'' \cdot e^{j\omega_e t_{\Delta 3}}$$
$$= \begin{bmatrix} i'''_\alpha \\ i'''_\beta \end{bmatrix}$$
$$= \begin{bmatrix} i''_a \cos(\omega_e t_{\Delta 3}) - \dfrac{i'_c - i''_a \cos(\omega_e t_{\Delta 2} - 2\pi/3)}{\sin(\omega_e t_{\Delta 2} - 2\pi/3)} \cdot \sin(\omega_e t_{\Delta 3}) \\ \dfrac{i'_c - i''_a \cos(\omega_e t_{\Delta 2} - 2\pi/3)}{\sin(\omega_e t_{\Delta 2} - 2\pi/3)} \cdot \cos(\omega_e t_{\Delta 3}) + i''_a \sin(\omega_e t_{\Delta 3}) \end{bmatrix}.$$

When $i''_a, i'_c$ are known, i.e., the c-phase current and the a-phase current are acquired by the acquiring module 300, the current vector $\vec{I}'''$ at the time $t'''_p$ can be calculated by the synchronously calculating module 400.

Therefore, after the synchronous conversion is performed by the synchronously calculating module 400 on the two sampled currents (the c-phase current and the a-phase current) and the command voltage or the sampled voltage, the voltage vector $\vec{V}'''$ and the current vector $\vec{I}'''$ at the time $t'''_p$, i.e., the voltage vector $\vec{V}'''$ and the current vector $\vec{I}'''$ at the random time of each PWM cycle, can be acquired, so as to allow the current vector and the voltage vector input to the flux observer to be at the same time, thus improving the accuracy of the angle output by the flux observer and allowing the motor to run normally.

In another embodiment of the present disclosure, the two sampled currents may also correspond to the c-phase current and the b-phase current, and the synchronously calculating module 400 may perform similar processes to acquire the voltage vector $\vec{V}'''$ at the time $t'''_p$ as:

$$\vec{V}''' = \begin{bmatrix} v'''_\alpha \\ v'''_\beta \end{bmatrix} \tag{69}$$
$$= \begin{bmatrix} v_\alpha \cos(\omega_e(t_{\Delta 1} + t_{\Delta 2} + t_{\Delta 3})) - v_\beta \sin(\omega_e(t_{\Delta 1} + t_{\Delta 2} + t_{\Delta 3})) \\ v_\beta \cos(\omega_e(t_{\Delta 1} + t_{\Delta 2} + t_{\Delta 3})) + v_\alpha \sin(\omega_e(t_{\Delta 1} + t_{\Delta 2} + t_{\Delta 3})) \end{bmatrix},$$

and the current vector $\vec{I}'''$ at the time $t'''_p$ as:

$$\vec{I}''' = \begin{bmatrix} i'''_\alpha \\ i'''_\beta \end{bmatrix} \tag{70}$$
$$= \begin{bmatrix} \dfrac{i''_b \sin(\omega_e t_{\Delta 2} - 2\pi/3) - i'_c \sin(2\pi/3)}{\sin(\omega_e t_{\Delta 2} - 4\pi/3)} \cos(\omega_e t_{\Delta 3}) - \\ \dfrac{i'_c \cos(2\pi/3) - i''_b \cos(\omega_e t_{\Delta 2} - 2\pi/3)}{\sin(\omega_e t_{\Delta 2} - 4\pi/3)} \cdot \sin(\omega_e t_{\Delta 3}) \\ \dfrac{i''_c \cos(2\pi/3) - i''_b \cos(\omega_e t_{\Delta 2} - 2\pi/3)}{\sin(\omega_e t_{\Delta 2} - 4\pi/3)} \cdot \cos(\omega_e t_{\Delta 3}) + \\ \dfrac{i''_b \sin(\omega_e t_{\Delta 2} - 2\pi/3) - i'_c \sin(2\pi/3)}{\sin(\omega_e t_{\Delta 2} - 4\pi/3)} \sin(\omega_e t_{\Delta 3}) \end{bmatrix}.$$

Therefore, after the synchronous conversion is performed by the synchronously calculating module 400 on the two sampled currents (the c-phase current and the b-phase current), and the command voltage or the sampled voltage, the voltage vector $\vec{V}'''$ and the current vector $\vec{I}'''$ at the time $t'''_p$, i.e., the voltage vector $\vec{V}'''$ and the current vector $\vec{I}'''$ at the random time of each PWM cycle, can be acquired, so as to allow the current vector and the voltage vector input to the flux observer to be at the same time, thus improving the accuracy of the angle output by the flux observer and allowing the motor to run normally.

The two sampled currents may also correspond to the a-phase current and the b-phase current, and the synchronously calculating module 400 may perform similar processes to acquire the voltage vector $\vec{V}'''$ at the time $t'''_p$ as:

$$\vec{V}''' = \begin{bmatrix} v_\alpha''' \\ v_\beta''' \end{bmatrix} \quad (71)$$

$$= \begin{bmatrix} v_\alpha \cos(\omega_e(t_{\Delta 1} + t_{\Delta 2} + t_{\Delta 3})) - v_\beta \sin(\omega_e(t_{\Delta 1} + t_{\Delta 2} + t_{\Delta 3})) \\ v_\beta \cos(\omega_e(t_{\Delta 1} + t_{\Delta 2} + t_{\Delta 3})) + v_\alpha \sin(\omega_e(t_{\Delta 1} + t_{\Delta 2} + t_{\Delta 3})) \end{bmatrix},$$

and the current vector $\vec{I}'''$ at the time $t'''_p$ as:

$$\vec{I}''' = \begin{bmatrix} i_\alpha''' \\ i_\beta''' \end{bmatrix} \quad (72)$$

$$= \begin{bmatrix} i_a'' \cos(\omega_e t_{\Delta 3}) - \dfrac{i_b' - i_a'' \cos(\omega_e t_{\Delta 2} + 2\pi/3)}{\sin(\omega_e t_{\Delta 2} + 2\pi/3)} \cdot \sin(\omega_e t_{\Delta 3}) \\ \dfrac{i_b' - i_a'' \cos(\omega_e t_{\Delta 2} + 2\pi/3)}{\sin(\omega_e t_{\Delta 2} + 2\pi/3)} \cdot \cos(\omega_e t_{\Delta 3}) + i_a'' \sin(\omega_e t_{\Delta 3}) \end{bmatrix}.$$

Therefore, after the synchronous conversion is performed by the synchronously calculating module 400 on the two sampled currents (the a-phase current and the b-phase current), and the command voltage or the sampled voltage, the voltage vector $\vec{V}'''$ and the current vector $\vec{I}'''$ at the time $t'''_p$, i.e., the voltage vector $\vec{V}'''$ and the current vector $\vec{I}'''$ at the random time of each PWM cycle, can be acquired, so as to allow the current vector and the voltage vector input to the flux observer to be at the same time, thus improving the accuracy of the angle output by the flux observer and allowing the motor to run normally.

With such a device for synchronously calculating a reconstructed phase current and a phase voltage for a motor driver according to the embodiments of the present disclosure, the current reconstructing module is configured to perform phase current reconstruction according to the DC bus current sampled by the current sampling module to acquire the three-phase current of the motor. The acquiring module is configured to acquire two sampled currents of each PWM cycle as the two-phase current of the motor and acquire the command voltage or the sampled voltage during the phase current reconstruction. The synchronously calculating module is configured to perform synchronous conversion on the two sampled currents and the command voltage or the sampled voltage to allow the current vector and the voltage vector, that are input to the flux observer, to keep synchronous. Therefore, the device may improve the accuracy of the angle output by the flux observer and allow the motor to run normally.

Corresponding to the above embodiments, the present disclosure further provides a motor driving system.

The motor driving system according to the embodiments of the present disclosure includes a device for synchronously calculating a reconstructed phase current and a phase voltage for a motor driver provided in the above embodiments of the present disclosure, specific embodiments of the motor driving system may refer to the embodiments described above, which are not described herein again to avoid redundancy.

The motor driving system according to the embodiments of the present disclosure may improve the accuracy of the angle output by the flux observer and allow the motor to run normally.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise", "counterclockwise", "axial", "radial" and "circumferential" should be construed to refer to the orientation as then described or as shown in the drawings under discussion. These relative terms are for convenience of description and do not require that the present disclosure be constructed or operated in a particular orientation, and thus shall not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, unless specified otherwise, "a plurality of" means two or more than two.

In the present disclosure, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the description, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. Thus, the appearances of above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples described in the specification, as well as features of embodiments or examples, without conflicting, may be combined by one skilled in the art.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

It should be noted that, as used herein, the terms "including," "comprising," or any other variations thereof are intended to cover a non-exclusive inclusion such that a process, method, article, or apparatus that includes a series of elements includes not only those elements, but other elements as well that have not expressly listed, or further includes elements inherent to such processes, methods, articles, or apparatuses. Without further limitations, an element modified by the phrase "including a . . . " does not exclude the existence of additional identical elements in the process, method, article, or apparatus that includes this element.

Sequence numbers applied to the foregoing embodiments according to the present disclosure are merely for description purposes and are not intended to indicate the advantages and disadvantages of these embodiments.

Through the above description of the embodiments, those skilled in the art can clearly understand that the above-mentioned method embodiments can be implemented by means of software plus a necessary universal hardware platform. Of course, they can also be implemented by hardware, but in many cases the former will be better. Based on such an understanding, the essential technical solution of this disclosure, or the portion that contributes to the prior art may be embodied as software products. Computer software products can be stored in a storage medium (such as a ROM/RAM, a magnetic disk, or an optical disc), and can include multiple instructions that when executed cause a device (e.g., a device including one or more processors and memory), to execute the methods in accordance with various embodiments.

The foregoing merely illustrates some exemplary embodiments of this disclosure and is not intended as limiting the patentable scope of the disclosure. Any equivalent configurational or flow transformations made taking advantage of the foregoing description and accompanying drawings of this disclosure, or any direct or indirect applications in other related technical fields will all be compassed within the patentable scope of this disclosure.

What is claimed is:

1. A method, comprising:
    sampling a direct current (DC) bus current and performing phase current reconstruction according to the DC bus current to acquire a three-phase current of a motor;
    during the phase current reconstruction, acquiring two sampled currents of each pulse width modulation (PWM) cycle as a two-phase current of the motor and acquiring a command voltage or a sampled voltage; and
    performing synchronous conversion on the two sampled currents and the command voltage or the sampled voltage to keep a current vector and a voltage vector synchronous, wherein the current vector and the voltage vector are input to a flux observer.

2. The method of claim 1, wherein performing the synchronous conversion on the two sampled currents and the command voltage or the sampled voltage includes:
    in accordance with a determination that a first criterion is satisfied, simultaneously converting the two sampled currents into two currents at a time corresponding to the command voltage or the sampled voltage;
    in accordance with a determination that a second criterion is satisfied, simultaneously converting one current of the two sampled currents and the command voltage or the sampled voltage into a current and a voltage at a time corresponding to the other current of the two sampled currents; and
    in accordance with a determination that a third criterion is satisfied, simultaneously converting the two sampled currents and the command voltage or the sampled voltage into two currents and a voltage at a random time in each PWM cycle.

3. The method of claim 2, wherein the first criterion is satisfied if the two sampled currents correspond to a c-phase current and an a-phase current, and the c-phase current and the a-phase current are synchronously converted according to the following formula:

$$\begin{bmatrix} i_\alpha \\ i_\beta \end{bmatrix} = \begin{bmatrix} i''_a \cdot \cos(\omega_e(t_{\Delta 1} + t_{\Delta 2})) + \dfrac{i'_c - i''_a \cos(\omega_e t_{\Delta 2} - 2\pi/3)}{\sin(\omega_e t_{\Delta 2} + 2\pi/3)} \cdot \sin(\omega_e(t_{\Delta 1} + t_{\Delta 2})) \\ \dfrac{i'_c - i''_a \cos(\omega_e t_{\Delta 2} + 2\pi/3)}{\sin(\omega_e t_{\Delta 2} + 2\pi/3)} \cdot \cos(\omega_e(t_{\Delta 1} + t_{\Delta 2})) + i''_a \cdot \sin(\omega_e(t_{\Delta 1} + t_{\Delta 2})) \end{bmatrix},$$

where $i_\alpha, i_\beta$ represent currents in a two-phase stationary coordinate system, respectively, $t_{\alpha 1}$ represents a time difference between the time corresponding to the command voltage or the sampled voltage and a time corresponding to the c-phase current, $t_{\beta 2}$ represents a time difference between the time corresponding to the c-phase current and a time corresponding to the a-phase current, $\omega_e$ represents an electrical angular frequency, and $i''_a, i'_c$ represent the a-phase current and the c-phase current, respectively.

4. The method of claim 2, wherein the second criterion is satisfied if the two sampled currents correspond to a c-phase current and an a-phase current, and the command voltage or the sampled voltage and the c-phase current and the a-phase current are synchronously converted according to the following formulas:

$$\begin{bmatrix} v''_\alpha \\ v''_\beta \end{bmatrix} = \begin{bmatrix} v_\alpha \cos(\omega_e(t_{\Delta 1} + t_{\Delta 2})) - v_\beta \sin(\omega_e(t_{\Delta 1} + t_{\Delta 2})) \\ v_\beta \cos(\omega_e(t_{\Delta 1} + t_{\Delta 2})) + v_\alpha \sin(\omega_e(t_{\Delta 1} + t_{\Delta 2})) \end{bmatrix},$$

$$\begin{bmatrix} i''_\alpha \\ i''_\beta \end{bmatrix} = \begin{bmatrix} i''_a \\ \dfrac{i'_c - i''_a \cos(\omega_e t_{\Delta 2} - 2\pi/3)}{\sin(\omega_e t_{\Delta 2} - 2\pi/3)} \end{bmatrix},$$

where $v_\alpha, v_\beta$ represent voltages in a two-phase stationary coordinate system, respectively, $v''_\alpha, v''_\beta$ represent voltages at a time corresponding to the a-phase current in the two-phase stationary coordinate system, respectively, $i''_\alpha, i''_\beta$ represent currents at the time corresponding to the a-phase current in the two-phase stationary coordinate system, respectively, $t_{\Delta 1}$ represents a time difference between the time corresponding to the command voltage or the sampled voltage and a time corresponding to the c-phase current, $t_{\beta 2}$ represents a time difference between the time corresponding to the c-phase current and the time corresponding to the a-phase current, $\omega_e$ represents an electrical angular frequency, and $i'''_a, i'_c$ represent the a-phase current and the c-phase current, respectively.

5. The method of claim 2, wherein the third criterion is satisfied if the two sampled currents correspond to a c-phase current and an a-phase current, and the command voltage or the sampled voltage and the c-phase current and the a-phase current are synchronously converted according to the following formulas:

$$\begin{bmatrix} v'''_\alpha \\ v'''_\beta \end{bmatrix} = \begin{bmatrix} v_\alpha \cos(\omega_e(t_{\Delta 1} + t_{\Delta 2} + t_{\Delta 3})) - v_\beta \sin(\omega_e(t_{\Delta 1} + t_{\Delta 2} + t_{\Delta 3})) \\ v_\beta \cos(\omega_e(t_{\Delta 1} + t_{\Delta 2} + t_{\Delta 3})) + v_\alpha \sin(\omega_e(t_{\Delta 1} + t_{\Delta 2} + t_{\Delta 3})) \end{bmatrix},$$

$$\begin{bmatrix} i'''_\alpha \\ i'''_\beta \end{bmatrix} = \begin{bmatrix} i''_a \cos(\omega_e t_{\Delta 3}) - \dfrac{i'_c - i''_a \cos(\omega_e t_{\Delta 2} - 2\pi/3)}{\sin(\omega_e t_{\Delta 2} - 2\pi/3)} \cdot \sin(\omega_e t_{\Delta 3}) \\ \dfrac{i'_c - i''_a \cos(\omega_e t_{\Delta 2} - 2\pi/3)}{\sin(\omega_e t_{\Delta 2} - 2\pi/3)} \cdot \cos(\omega_e t_{\Delta 3}) + i''_a \sin(\omega_e t_{\Delta 3}) \end{bmatrix},$$

where $v_\alpha, v_\beta$ represent voltages in a two-phase stationary coordinate system, respectively, $v'''_\alpha, v'''_\beta$ represent voltages at a random time in the two-phase stationary coordinate system, respectively, $i'''_\alpha, i'''_\beta$ represent currents at the random time in the two-phase stationary coordinate system, respectively, $t_{\Delta 1}$ represents a time difference between the time corresponding to the command voltage or the sampled voltage and a time corresponding to the c-phase current, $t_{\Delta 2}$ represents a time difference between the time corresponding to the c-phase current and the time corresponding to the a-phase current, $t_{\Delta 3}$ represents a time difference between the time corresponding to the a-phase current and the random time, $\omega_e$ represents an electrical angular frequency, and $i''_a, i'_c$ represent the a-phase current and the c-phase current, respectively.

6. A non-transitory computer-readable storage medium storing one or more computer programs comprising instructions that, when executed by an electronic device, cause the electronic device to:

sample a direct current (DC) bus current and performing phase current reconstruction according to the DC bus current to acquire a three-phase current of a motor;

during the phase current reconstruction, acquire two sampled currents of each pulse width modulation (PWM) cycle as a two-phase current of the motor and acquiring a command voltage or a sampled voltage; and perform synchronous conversion on the two sampled currents and the command voltage or the sampled voltage to keep a current vector and a voltage vector synchronous, wherein the current vector and the voltage vector are input to a flux observer.

7. The computer-readable storage medium of claim 6, wherein performing the synchronous conversion on the two sampled currents and the command voltage or the sampled voltage includes:

in accordance with a determination that a first criterion is satisfied, simultaneously converting the two sampled currents into two currents at a time corresponding to the command voltage or the sampled voltage;

in accordance with a determination that a second criterion is satisfied, simultaneously converting one current of the two sampled currents and the command voltage or the sampled voltage into a current and a voltage at a time corresponding to the other current of the two sampled currents; and in accordance with a determination that a third criterion is satisfied, simultaneously converting the two sampled currents and the command voltage or the sampled voltage into two currents and a voltage at a random time in each PWM cycle.

8. The computer readable storage medium of claim 7, wherein the first criterion is satisfied if the two sampled currents correspond to a c-phase current and an a-phase current, and the c-phase current and the a-phase current are synchronously converted according to the following formula:

$$\begin{bmatrix} i_\alpha \\ i_\beta \end{bmatrix} =$$

$$\begin{bmatrix} i''_a \cdot \cos(\omega_e(t_{\Delta 1} + t_{\Delta 2})) + \dfrac{i'_c - i''_a \cos(\omega_e t_{\Delta 2} - 2\pi/3)}{\sin(\omega_e t_{\Delta 2} - 2\pi/3)} \cdot \sin(\omega_e(t_{\Delta 1} + t_{\Delta 2})) \\ \dfrac{i'_c - i''_a \cos(\omega_e t_{\Delta 2} - 2\pi/3)}{\sin(\omega_e t_{\Delta 2} - 2\pi/3)} \cdot \cos(\omega_e(t_{\Delta 1} + t_{\Delta 2})) - i''_a \cdot \sin(\omega_e(t_{\Delta 1} + t_{\Delta 2})) \end{bmatrix},$$

where $i_\alpha, i_\beta$ represent currents in a two-phase stationary coordinate system, respectively, $t_{\Delta 1}$ represents a time difference between the time corresponding to the command voltage or the sampled voltage and a time corresponding to the c-phase current, $t_{\Delta 2}$ represents a time difference between the time corresponding to the c-phase current and a time corresponding to the a-phase current, $\omega_e$ represents an electrical angular frequency, and $i''_a, i'_c$ represent the a-phase current and the c-phase current, respectively.

9. The computer readable storage medium of claim 7, wherein the second criterion is satisfied if the two sampled currents correspond to a c-phase current and an a-phase current, and the command voltage or the sampled voltage and the c-phase current and the a-phase current are synchronously converted according to the following formulas:

$$\begin{bmatrix} v''_\alpha \\ v''_\beta \end{bmatrix} = \begin{bmatrix} v_\alpha \cos(\omega_e(t_{\Delta 1} + t_{\Delta 2})) - v_\beta \sin(\omega_e(t_{\Delta 1} + t_{\Delta 2})) \\ v_\beta \cos(\omega_e(t_{\Delta 1} + t_{\Delta 2})) + v_\alpha \sin(\omega_e(t_{\Delta 1} + t_{\Delta 2})) \end{bmatrix},$$

$$\begin{bmatrix} i''_\alpha \\ i''_\beta \end{bmatrix} = \begin{bmatrix} i''_a \\ \dfrac{i'_c - i''_a \cos(\omega_e t_{\Delta 2} - 2\pi/3)}{\sin(\omega_e t_{\Delta 2} - 2\pi/3)} \end{bmatrix},$$

where $v_\alpha, v_\beta$ represent voltages in a two-phase stationary coordinate system, respectively, $v''_\alpha, v''_\beta$ represent voltages at a time corresponding to the a-phase current in the two-phase stationary coordinate system, respectively, $i''_\alpha, i''_\beta$ represent currents at the time corresponding to the a-phase current in the two-phase stationary coordinate system, respectively, $t_{\Delta 1}$ represents a time difference between the time corresponding to the command voltage or the sampled voltage and a time corresponding to the c-phase current, $t_{\Delta 2}$ represents a time difference between the time corresponding to the c-phase current and the time corresponding to the a-phase current, $\omega_e$ represents an electrical angular frequency, and $i''_a, i''_c$ represent the a-phase current and the c-phase current, respectively.

10. The computer readable storage medium of claim 7, wherein the third criterion is satisfied if the two sampled currents correspond to a c-phase current and an a-phase current, and the command voltage or the sampled voltage and the c-phase current and the a-phase current are synchronously converted according to the following formulas:

$$\begin{bmatrix} v'''_\alpha \\ v'''_\beta \end{bmatrix} = \begin{bmatrix} v_\alpha \cos(\omega_e(t_{\Delta 1} + t_{\Delta 2} + t_{\Delta 3})) - v_\beta \sin(\omega_e(t_{\Delta 1} + t_{\Delta 2} + t_{\Delta 3})) \\ v_\beta \cos(\omega_e(t_{\Delta 1} + t_{\Delta 2} + t_{\Delta 3})) + v_\alpha \sin(\omega_e(t_{\Delta 1} + t_{\Delta 2} + t_{\Delta 3})) \end{bmatrix},$$

$$\begin{bmatrix} i'''_\alpha \\ i'''_\beta \end{bmatrix} = \begin{bmatrix} i''_a \cos(\omega_e t_{\Delta 3}) - \frac{i'_c - i''_a \cos(\omega_e t_{\Delta 2} - 2\pi/3)}{\sin(\omega_e t_{\Delta 2} - 2\pi/3)} \cdot \sin(\omega_e t_{\Delta 3}) \\ \frac{i'_c - i''_a \cos(\omega_e t_{\Delta 2} - 2\pi/3)}{\sin(\omega_e t_{\Delta 2} - 2\pi/3)} \cdot \cos(\omega_e t_{\Delta 3}) + i''_a \sin(\omega_e t_{\Delta 3}) \end{bmatrix},$$

where $v_\alpha, v_\beta$ represent voltages in a two-phase stationary coordinate system, respectively, $v''_\alpha, v''_\beta$ represent voltages at a random time in the two-phase stationary coordinate system, respectively, $i'''_\alpha, i'''_\beta$ represent currents at the random time in the two-phase stationary coordinate system, respectively, $t_{\Delta 1}$ represents a time difference between the time corresponding to the command voltage or the sampled voltage and a time corresponding to the c-phase current, $t_{\Delta 2}$ represents a time difference between the time corresponding to the c-phase current and the time corresponding to the a-phase current, $t_{\Delta 3}$, represents a time difference between the time corresponding to the a-phase current and the random time, $\omega_e$ represents an electrical angular frequency, and $i''_a, i'_c$ represent the a-phase current and the c-phase current, respectively.

11. A motor driving system including one or more processors, memory, and one or more programs, wherein the one or more programs are stored in the memory and configured to be executed by the one or more processors, the one or more programs including instructions for:
sampling a direct current (DC) bus current and performing phase current reconstruction according to the DC bus current to acquire a three-phase current of a motor;
during the phase current reconstruction, acquiring two sampled currents of each pulse width modulation (PWM) cycle as a two-phase current of the motor and acquiring a command voltage or a sampled voltage;
performing synchronous conversion on the two sampled currents and the command voltage or the sampled voltage to keep a current vector and a voltage vector synchronous, wherein the current vector and the voltage vector are input to a flux observer.

12. The motor driving system of claim 11, wherein performing the synchronous conversion on the two sampled currents and the command voltage or the sampled voltage includes:
in accordance with a determination that a first criterion is satisfied, simultaneously converting the two sampled currents into two currents at a time corresponding to the command voltage or the sampled voltage;
in accordance with a determination that a second criterion is satisfied, simultaneously converting one current of the two sampled currents and the command voltage or the sampled voltage into a current and a voltage at a time corresponding to the other current of the two sampled currents; and
in accordance with a determination that a third criterion is satisfied, simultaneously converting the two sampled currents and the command voltage or the sampled voltage into two currents and a voltage at a random time in each PWM cycle.

13. The motor driving system of claim 12, wherein the first criterion is satisfied if the two sampled currents correspond to a c-phase current and an a-phase current, and the c-phase current and the a-phase current are synchronously converted on according to the following formula:

$$\begin{bmatrix} i_\alpha \\ i_\beta \end{bmatrix} = \begin{bmatrix} i''_a \cdot \cos(\omega_e(t_{\Delta 1} + t_{\Delta 2})) + \frac{i'_c - i''_a \cos(\omega_e t_{\Delta 2} - 2\pi/3)}{\sin(\omega_e t_{\Delta 2} - 2\pi/3)} \cdot \sin(\omega_e(t_{\Delta 1} + t_{\Delta 2})) \\ \frac{i'_c - i''_a \cos(\omega_e t_{\Delta 2} - 2\pi/3)}{\sin(\omega_e t_{\Delta 2} - 2\pi/3)} \cdot \cos(\omega_e(t_{\Delta 1} t_{\Delta 2})) - i''_a \cdot \sin(\omega_e(t_{\Delta 1} + t_{\Delta 2})) \end{bmatrix},$$

where $i_\alpha, i_\beta$ represent currents in a two-phase stationary coordinate system, respectively, $t_{\Delta 1}$ represents a time difference between the time corresponding to the command voltage or the sampled voltage and a time corresponding to the c-phase current, $t_{\Delta 2}$ represents a time difference between the time corresponding to the c-phase current and a time corresponding to the a-phase current, $\omega_e$ represents an electrical angular frequency, and $i''_a, i'_c$ represent the a-phase current and the c-phase current, respectively.

14. The motor driving system of claim 12, wherein the second criterion is satisfied if the two sampled currents correspond to a c-phase current and an a-phase current, and the command voltage or the sampled voltage and the c-phase current and the a-phase current are synchronously converted according to the following formulas:

$$\begin{bmatrix} v''_\alpha \\ v''_\beta \end{bmatrix} = \begin{bmatrix} v_\alpha \cos(\omega_e(t_{\Delta 1} + t_{\Delta 2})) - v_\beta \sin(\omega_e(t_{\Delta 1} + t_{\Delta 2})) \\ v_\beta \cos(\omega_e(t_{\Delta 1} + t_{\Delta 2})) + v_\alpha \sin(\omega_e(t_{\Delta 1} + t_{\Delta 2})) \end{bmatrix},$$

$$\begin{bmatrix} i''_\alpha \\ i''_\beta \end{bmatrix} = \begin{bmatrix} i''_a \\ \frac{i'_c - i''_a \cos(\omega_e t_{\Delta 2} - 2\pi/3)}{\sin(\omega_e t_{\Delta 2} - 2\pi/3)} \end{bmatrix},$$

where $v_\alpha, v_\beta$ represent voltages in a two-phase stationary coordinate system, respectively, $v''_\alpha, v''_\beta$ represent voltages at a time corresponding to the a-phase current in the two-phase stationary coordinate system, respectively, $i''_\alpha, i''_\beta$ represent currents at the time corresponding to the a-phase current in the two-phase stationary coordinate system, respectively, $t_{\Delta 1}$ represents a time difference between the time corresponding to the command voltage or the sampled voltage and a time corresponding to the c-phase current, $t_{\Delta 2}$ represents a time difference between the time corresponding to the c-phase current and the time corresponding to the a-phase current, $\omega_e$ represents an electrical angular frequency, and $i''_a, i'_c$ represent the a-phase current and the c-phase current, respectively.

15. The motor driving system of claim 12, wherein the third criterion is satisfied if the two sampled currents correspond to a c-phase current and an a-phase current, and the command voltage or the sampled voltage and the c-phase current and the a-phase current are synchronously converted according to the following formulas:

$$\begin{bmatrix} v_\alpha''' \\ v_\beta''' \end{bmatrix} = \begin{bmatrix} v_\alpha \cos(\omega_e(t_{\Delta 1} + t_{\Delta 2} + t_{\Delta 3})) - v_\beta \sin(\omega_e(t_{\Delta 1} + t_{\Delta 2} + t_{\Delta 3})) \\ v_\beta \cos(\omega_e(t_{\Delta 1} + t_{\Delta 2} + t_{\Delta 3})) + v_\alpha \sin(\omega_e(t_{\Delta 1} + t_{\Delta 2} + t_{\Delta 3})) \end{bmatrix},$$

$$\begin{bmatrix} i_\alpha''' \\ i_\beta''' \end{bmatrix} = \begin{bmatrix} i_a'' \cos(\omega_e t_{\Delta 3}) - \dfrac{i_c' - i_a'' \cos(\omega_e t_{\Delta 2} - 2\pi/3)}{\sin(\omega_e t_{\Delta 2} - 2\pi/3)} \cdot \sin(\omega_e t_{\Delta 3}) \\ \dfrac{i_c' - i_a'' \cos(\omega_e t_{\Delta 2} - 2\pi/3)}{\sin(\omega_e t_{\Delta 2} - 2\pi/3)} \cdot \cos(\omega_e t_{\Delta 3}) + i_a'' \sin(\omega_e t_{\Delta 3}) \end{bmatrix},$$

where $v_\alpha, v_\beta$ represent voltages in a two-phase stationary coordinate system, respectively, $v'''_\alpha, v'''_\beta$ represent voltages at a random time in the two-phase stationary coordinate system, respectively, $i'''_\alpha, i'''_\beta$ represent currents at the random time in the two-phase stationary coordinate system, respectively, $t_{\Delta 1}$ represents a time difference between the time corresponding to the command voltage or the sampled voltage and a time corresponding to the c-phase current, $t_{\Delta 2}$ represents a time difference between the time corresponding to the c-phase current and the time corresponding to the a-phase current, $t_{\Delta 3}$ represents a time difference between the time corresponding to the a-phase current and the random time, $\omega_e$ represents an electrical angular frequency, and $i''_a, i''_c$ represent the a-phase current and the c-phase current, respectively.

* * * * *